US011985648B2

(12) United States Patent
Takeda et al.

(10) Patent No.: US 11,985,648 B2
(45) Date of Patent: May 14, 2024

(54) SECONDARY CELL ACTIVATION USING TEMPORARY REFERENCE SIGNALS AND BEAM SELECTION

(71) Applicant: QUALCOMM INCORPORATED, San Diego, CA (US)

(72) Inventors: Kazuki Takeda, Tokyo (JP); Changhwan Park, San Diego, CA (US); Heechoon Lee, San Diego, CA (US); Alberto Rico Alvarino, San Diego, CA (US); Peter Gaal, San Diego, CA (US); Juan Montojo, San Diego, CA (US); Wanshi Chen, San Diego, CA (US); Tao Luo, San Diego, CA (US); Olufunmilola Omolade Awoniyi-Oteri, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 260 days.

(21) Appl. No.: 17/449,654

(22) Filed: Sep. 30, 2021

(65) Prior Publication Data
US 2022/0116924 A1    Apr. 14, 2022

Related U.S. Application Data

(60) Provisional application No. 63/198,313, filed on Oct. 9, 2020.

(51) Int. Cl.
*H04L 12/26* (2006.01)
*H04W 24/02* (2009.01)
*H04W 72/044* (2023.01)

(52) U.S. Cl.
CPC ......... *H04W 72/046* (2013.01); *H04W 24/02* (2013.01)

(58) Field of Classification Search
CPC ... H04W 72/046; H04W 24/02; H04W 24/08; H04W 24/10; H04W 76/15;
(Continued)

(56) References Cited

U.S. PATENT DOCUMENTS

2019/0150161 A1* 5/2019 Cheng .................. H04W 80/02
  370/330
2020/0314812 A1* 10/2020 Xu ........................ H04W 72/23
(Continued)

FOREIGN PATENT DOCUMENTS

CA    3072602 A1 *  2/2019 ............. H04B 17/17

OTHER PUBLICATIONS

Intel Corporation: "Discussion on SCell Activation Delay in FR2", 3GPP Draft, 3GPP TSG-RAN WG4 Meeting #91, R4-1905761, NR SCell Activation IN FR2 V6_CL, 3rd Generation Partnership Project (3GPP), Sophia-Antipolis Cedex, France, vol. RAN WG4, No. Reno, US, May 13, 2019-May 17, 2019, May 3, 2019, XP051715831, 6 Pages, Retrieved from the Internet: URL: http://www.3gpp.org/ftp/tsg%5Fran/WG4%5FRadio/TSGR4%5F91/Does/R4%2D1905761%2Ezip.
(Continued)

*Primary Examiner* — Thai D Hoang
(74) *Attorney, Agent, or Firm* — Haynes and Boone, LLP

(57) ABSTRACT

Systems, methods, and devices for secondary cell activation using temporary reference signals and beam selection are provided. In one aspect, a method of wireless communication is performed by a UE and includes receiving, from a base station (BS) via a first cell, an activation command to activate a second cell different from the first cell. The method further includes receiving, from the BS via the second cell during a cell activation period, a first reference signal different from a synchronization signal block (SSB) based on beam information. The method further includes
(Continued)

performing a first measurement of the first reference signal, and operating in the second cell based on the first measurement.

30 Claims, 12 Drawing Sheets

(58) Field of Classification Search
CPC ... H04L 5/0055; H04L 5/0023; H04L 5/0048; H04L 5/005; H04L 5/0053; H04L 5/0098; H04L 5/0007; H04B 7/0695
See application file for complete search history.

(56) References Cited

U.S. PATENT DOCUMENTS

| | | | |
|---|---|---|---|
| 2021/0068129 A1* | 3/2021 | Ryu | H04W 80/02 |
| 2022/0109543 A1* | 4/2022 | Ma | H04B 7/088 |
| 2022/0116924 A1* | 4/2022 | Takeda | H04L 5/0023 |

OTHER PUBLICATIONS

International Search Report and Written Opinion—PCT/US2021/053127—ISA/EPO—dated Jan. 28, 2022.

* cited by examiner

SECONDARY CELL ACTIVATION USING TEMPORARY REFERENCE SIGNALS AND BEAM SELECTION

CROSS-REFERENCE TO RELATED APPLICATIONS

The present application claims the benefit of and priority to U.S. Provisional Patent Application No. 63/198,313, filed Oct. 9, 2020, the entirety of which is incorporated by reference.

TECHNICAL FIELD

This application relates to wireless communication systems, and more particularly to secondary cell activation in a carrier aggregation system.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Carrier aggregation (CA) is a capability, for example, in LTE and 5G NR, in which two or more frequency bands or component carriers (CCs) can be combined to increase bandwidth. In some aspects, one CC may be used as an anchor carrier or a primary cell (Pcell) and another CC may be used as a supplemental carrier or a secondary cell (Scell). The Scell may include an uplink (UL) component carrier and a downlink (DL) component carrier. Alternatively, the Scell may include a DL component carrier only. In CA communication scenarios, a BS may activate an Scell for communication with a UE as needed, for example, based on traffic loading and/or channel conditions. The activation may include the UE performing measurements of synchronization signal blocks (SSBs) transmitted by the BS on the Scell. Once activated, the Scell can be used for scheduling DL and/or UL data transmissions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS) via a first cell, an activation command to activate a second cell different from the first cell; receiving, from the BS via the second cell during a cell activation period, a first reference signal different from a synchronization signal block (SSB) based on beam information; performing a first measurement of the first reference signal; and operating in the second cell based on the first measurement.

According to another aspect of the present disclosure, a method of wireless communication performed by a base station (BS) includes: transmitting, to a user equipment (UE) via a first cell, an activation command to activate a second cell different from the first cell; transmitting, to the UE via the second cell during a cell activation period, a first reference signal different from a synchronization signal block (SSB) based on beam information; receiving, from the UE, a first measurement report based on the first reference signal; and operating in the second cell based on the first measurement report.

According to another aspect of the present disclosure, a user equipment (UE) includes: a transceiver configured to: receive, from a base station (BS) via a first cell, an activation command to activate a second cell different from the first cell; and receive, from the BS via the second cell during a cell activation period, a first reference signal different from a synchronization signal block (SSB) based on beam information; and a processor configured to: perform a first measurement of the first reference signal; and operate in the second cell based on the first measurement.

According to another aspect of the present disclosure, a base station (BS) includes: a transceiver configured to: transmit, to a user equipment (UE) via a first cell, an activation command to activate a second cell different from the first cell; transmit, to the UE via the second cell during a cell activation period, a first reference signal different from a synchronization signal block (SSB) based on beam information; and receive, from the UE, a first measurement report based on the first reference signal; and a processor configured to: operate in the second cell based on the first measurement report.

According to another aspect of the present disclosure, a non-transitory computer-readable medium has program code recorded therein. The program code includes: code for causing a user equipment (UE) to receive, from a base station (BS) via a first cell, an activation command to activate a second cell different from the first cell; code for causing the UE to receive, from the BS via the second cell during a cell activation period, a first reference signal different from a synchronization signal block (SSB) based on beam information; code for causing the UE to perform a first measurement of the first reference signal; and code for causing the UE to operate in the second cell based on the first measurement.

According to another aspect of the present disclosure, a non-transitory computer-readable medium has program code recorded therein. The program code includes: code for causing a base station (BS) to transmit, to a user equipment (UE) via a first cell, an activation command to activate a second cell different from the first cell; code for causing the BS to transmit, to the UE via the second cell during a cell activation period, a first reference signal different from a synchronization signal block (SSB) based on beam information; and code for causing the BS to receive, from the UE, a first measurement report based on the first reference signal; and code for causing the BS to operate in the second cell based on the first measurement report.

According to another aspect of the present disclosure, a user equipment (UE) includes: means for receiving, from a base station (BS) via a first cell, an activation command to activate a second cell different from the first cell; means for receiving, from the BS via the second cell during a cell activation period, a first reference signal different from a synchronization signal block (SSB) based on beam information; means for performing a first measurement of the first reference signal; and means for operating in the second cell based on the first measurement.

According to another aspect of the present disclosure, a base station (BS) includes: means for transmitting, to a user equipment (UE) via a first cell, an activation command to activate a second cell different from the first cell; means for transmitting, to the UE via the second cell during a cell activation period, a first reference signal different from a synchronization signal block (SSB) based on beam information; means for receiving, from the UE, a first measurement report based on the first reference signal; and means for operating in the second cell based on the first measurement report.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
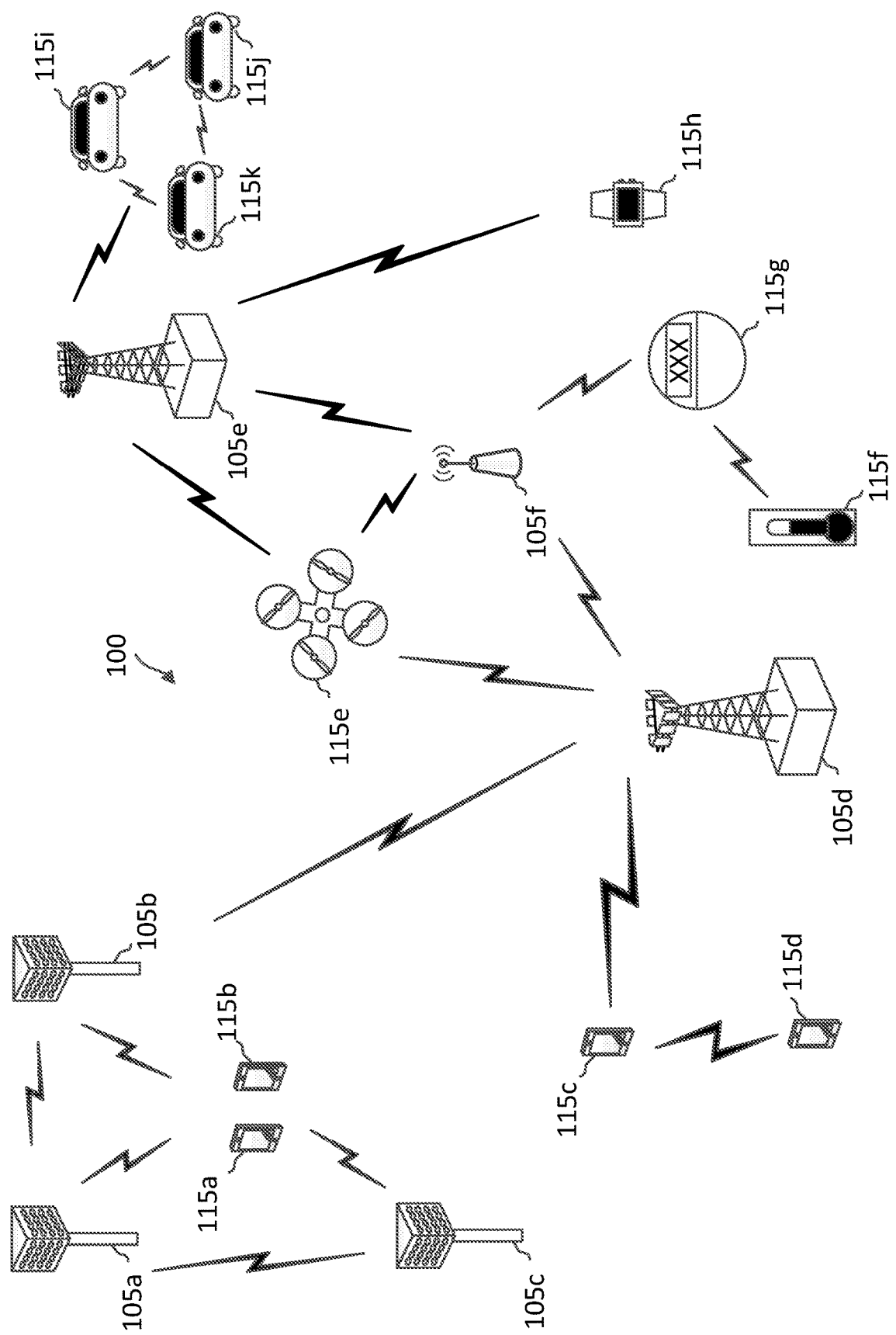
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 702.11, IEEE 702.16, IEEE 702.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In some aspects, 5G NR may be described as operating in two frequency ranges: FR1, which includes frequency bands of about 7 GHz and lower (e.g., 410 MHz to 6125 MHz), and FR2, which includes frequency bands between about 24.25 GHz and about 52.6 GHz, which may be referred to as the mmWave.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In order to transfer data at a higher rate, a UE and a BS may communicate over multiple frequency bands in parallel (a form of carrier aggregation (CA)). In this configuration, one of the bands can be associated with a primary cell (Pcell) and another with a secondary cell (Scell). In some aspects, a UE communicating with a BS over a single Pcell, or anchor cell, may activate an Scell for CA by receiving an activation command from the BS over the Pcell, and performing measurements of SSBs transmitted on the Scell. SSBs include reference signals, such as primary synchronization signals (PSS), secondary synchronization signal (SSS), and demodulation reference signals (DM-RS).

In some aspects, the BS may transmit reference signals or reference signal bursts in each of a plurality of beams, for example, when operating over a frequency band such as an FR2 band with a high path-loss. The beams may have different beam characteristics, for example, beam directions and/or beam widths. In some instances, the beams may be directed in different directions, and the UE may determine a preferred or selected transmit (Tx) beam, and/or a preferred or selected receive (Rx) beam. In some aspects, beam information indicating a selected beam may be determined by the UE based on measurements of reference signals associated with different beams. In other aspects, the BS may indicate the beam information to the UE via a variety of ways. For instance, the BS may configure the UE with a list of transmission configuration indicator (TCI) states associated with a set of transmit beams at the BS and may activate a certain TCI state for a certain signal transmission. The BS may also provide the UE with beam information by indicating quasi-co-located (QCL) assumptions or relationships among different signals (e.g., reference signals). The UE can perform measurements of the reference signals to perform various functions to establish and maintain communication over a given cell, such as automatic gain control (AGC), frequency tracking, time tracking, and cell detection. SSBs are detected and used by UEs during cell search and activation procedures to activate a cell. SSBs are transmitted via the Scell with an SSB periodicity, which may be one SSB or SSB burst every 20 ms, 40 ms, 80 ms, or any suitable periodicity. The relatively sparse SSBs in the Scell increase the delay from the time the UE receives the Scell activation command to the time the Scell is activated for operation. For example, if a UE receives an Scell activation command after or shortly before (e.g., <2 ms before) an SSB is transmitted, the UE may wait for at least one full SSB period (e.g., 20 ms) before the UE can perform the measurements involved with the cell activation. Further, the utilization of beamforming for transmissions can further delay the activation of an unknown cell where the activation procedure may include beam search for identifying a pair of transmit-receive beams between the BS and UE for communications. The increased delay to activate an Scell for CA can result in suboptimal performance and user experience.

As used herein, the terms "temporary reference signals (RSs)" may refer to a reference signal that is not part of an SSB and is scheduled for temporary use, for example, to assist a UE in performing AGC and/or fine tracking (e.g., time and/or frequency tracking) during cell activation. The temporary aspect may refer to one or more schedule instances within an activation duration of a cell (e.g., an Scell), and may not be present after the cell is activated. Further, as used herein the term "transmit beams" or "tx beams" may refer to a transmission beam having beam characteristics such as a beam width, a beam angle, a beam direction. Or a spatial direction."

Aspects of the present disclosure provide mechanisms for activating an Scell by detecting and measuring one or more temporary reference signals (RSs), such as tracking reference signals (TRS) and/or non-zero-power channel state information reference signals (NZP-CSI-RS). Temporary RSs can be transmitted more frequently than SSBs, in some aspects. One or more temporary RSs or RS bursts can be used in place of the SSBs by UEs for AGC and/or fine tracking (including time and/or frequency tracking). The temporary RSs can be triggered by the BS, and may be associated with or based on an activation command to activate the Scell. The BS may indicate to the UE the timing (e.g., slot number) and configuration of the temporary RS in downlink information, such as a downlink control information (DCI) in a physical downlink control channel (PDCCH), or a media access control element (MAC-CE) in a physical downlink shared channel (PDSCH). The BS and the UE may apply beamforming techniques to communicate with each other, for example, to improve performance and/or reach when operating in a channel with a high path-loss. For instance, the BS may utilize a set of transmit beams for transmissions, and the UE may utilize a set of receive beams for receptions. The BS and the UE may perform a beam search to identify an optimal pair of transmit-receive beams for communications. In some aspects, the BS and the UE may have established certain transmit-receive beam pair information in a certain frequency band. To facilitate activation of the Scell, the BS may transmit the one or more temporary RSs using a certain transmit beam from the set of transmit beams and may provide the UE with beam information associated with the certain transmit beam, for example, via a TCI activation and/or QCL assumption information. Accordingly, the UE may monitor and receive the one or more temporary RSs using a receive beam selected from the set of receive beams based on the beam information. In some aspects, the BS may not explicit indicate the beam information during the Scell activation, and the UE may monitor and receive the one or more temporary RSs based on previously acquired beam information (e.g., from another active cell or known cell in the same frequency band). In other aspects, the BS may transmit a set of temporary RS bursts using transmit beams corresponding to a set of SSBs (e.g., when activating an Scell with no prior beam information) so that the UE can perform a beam search using the temporary RS bursts instead of waiting for the set of SSBs, which may take a long period of time. Accordingly, the UE may determine the beam information from the temporary RSs by performing measurements of one or more reference signals or reference signal bursts. The UE may feedback measurement reports to the BS, and may include the beam information in the measurement report.

By triggering one or more temporary RSs associated with an Scell activation command, and indicating the triggering to the UE, the delay associated with activating the Scell can be reduced, and the BS and UE can begin operation on the Scell sooner, thereby improving performance and user experience. Further, indicating the temporary RSs to the UE in a PDCCH or PDSCH, such as the PDSCH that carries the Scell activation command may provide an efficient scheme for coordinating the Scell activation. The mechanisms described herein may be used in either FR1 or FR2, but may be particularly applicable to frequency bands within FR2.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may be an NR network supporting carrier aggregation (CA) of component carriers (CCs) in which more than one cell can be activated to support DL/UL transmissions. Each cell may correspond to a different CC, and may be within a same frequency band or within different frequency bands. In some aspects, a primary cell, or Pcell, may be an anchor serving cell on which the UE 115 can receive system information and configurations as well as DL/UL scheduling grants. In some aspect, a BS may activate a secondary cell, or Scell, by transmitting an Scell activation command to the UE via the Pcell. The activation command may be transmitted in a PDCCH, or in a PDSCH. In response to receiving the activation command, the UE 115 may perform measurements and/or detection protocols on one or more reference signals transmitted on the Scell by the BS 105, such as SSBs. Once the measurements and/or detection protocols have been performed, the UE may transmit a measurement report to the BS. The BS may then activate the Scell such that it can be used for DL and/or UL data transmissions.

Figure 2:
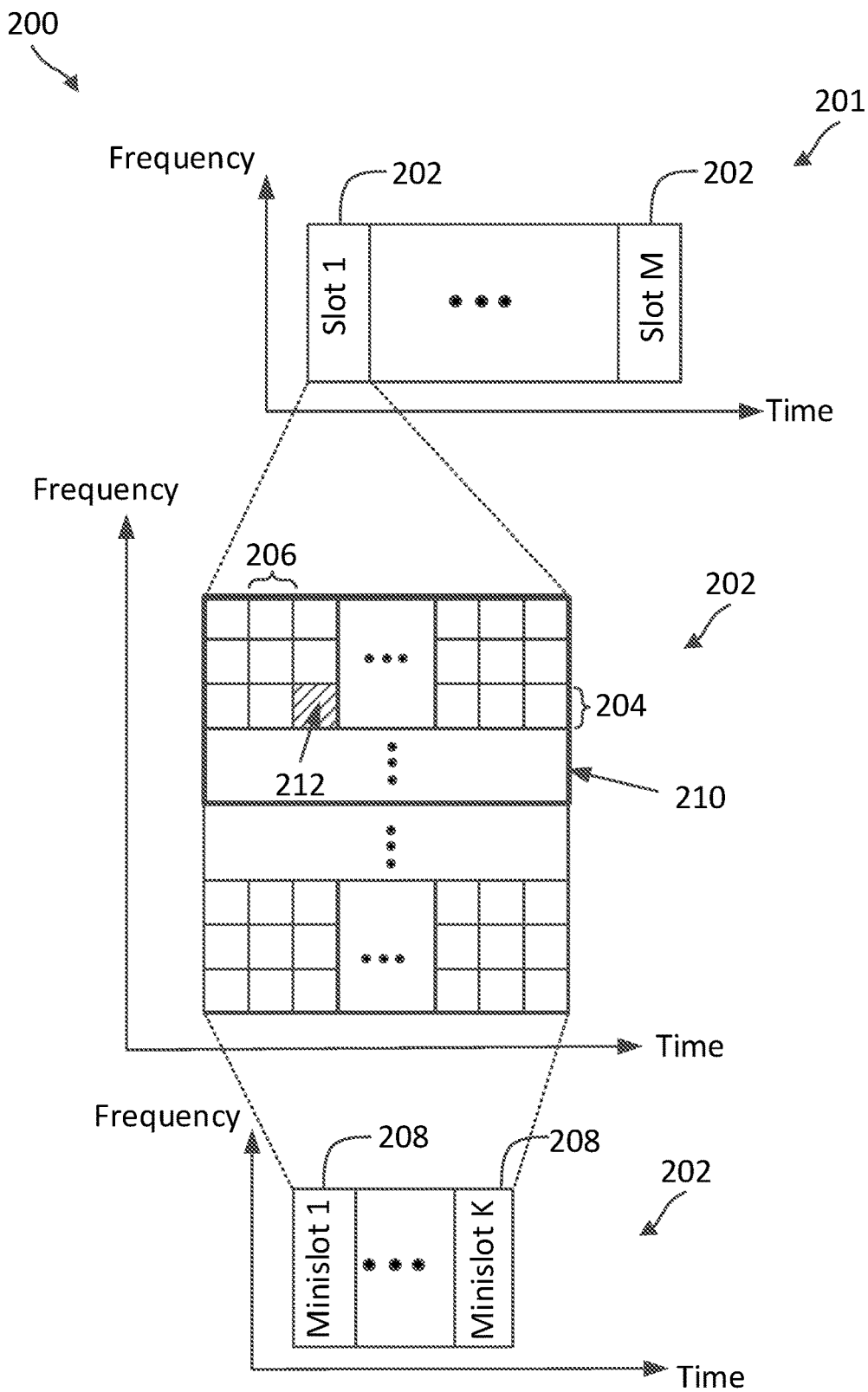
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel BW, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
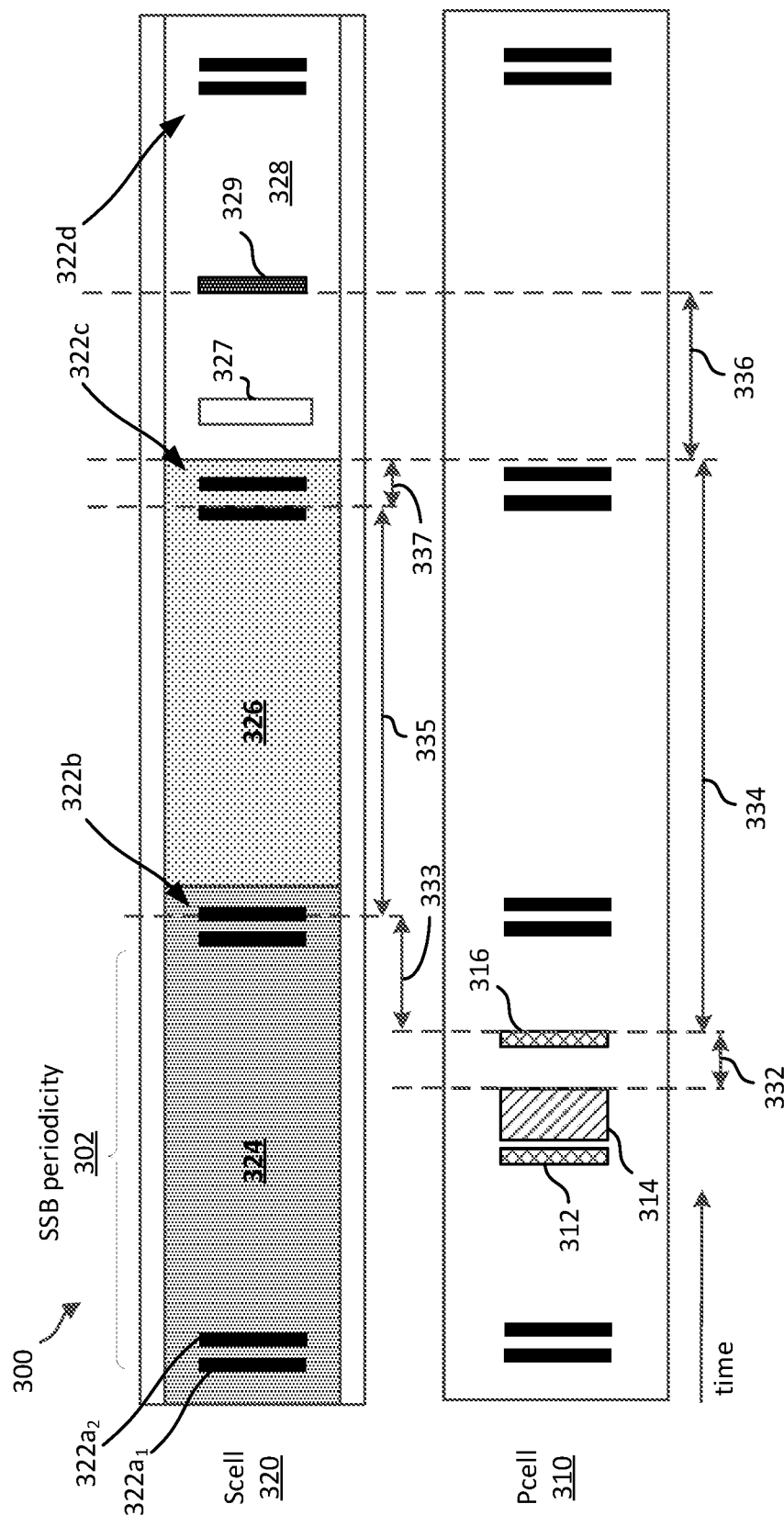
FIG. 3 illustrates a secondary cell (Scell) activation scheme using synchronization signal blocks (SSBs) according to some aspects of the present disclosure.

FIG. 3 illustrates an Scell activation scheme 300 according to some aspects of the present disclosure. The scheme 300 may be employed by BSs such as the BSs 105 and UEs such as the UEs 115 in a network such as the network 100 for communications. Described generally, the BS and UE may activate an Scell for DL/UL transmissions in response to an Scell activation signal 314 transmitted by the BS to a UE as shown in the scheme 300. The x-axis represent time in some arbitrary units.

FIG. 3 shows a Pcell 310 and an Scell 320. The Pcell 310, or primary cell, may be an anchor cell on which the UE receives control information and network configurations from the BS. As explained above, in order to offload DL and/or UL traffic from the Pcell 310, the BS can activate a secondary cell in a carrier aggregation (CA) communication scheme. Activating the Scell 320 includes detecting or measuring reference signals (RSs) transmitted on the Scell 320 for automatic gain control (AGC), frequency tracking, time tracking, and/or cell detection. The protocols associated with activating the Scell 320 cause a delay from the time the BS 105 transmits an Scell activation command (314) until the time the Scell activation is complete. The total time or activation delay associated with activating the Scell 320 may be a sum of individual delay periods 332, 334, 336 associated with different stages or phases or the Scell activation, which will be explained further below. In some aspects, the Scell 320 may be known to the UE. For example, in some aspects, the UE may have previously activated and then deactivated the Scell 320. Accordingly, the UE may have stored configuration information (e.g., SSB transmission parameters, system information, receive signal strength) associated with the Scell 320 that can be used in reactivating the Scell 320. In other aspects, the Scell 320 may be unknown to the UE.

To activate the Scell 320, the BS transmits, to the UE, an activation command 314. In FIG. 3, the activation command 314 may be carried by a PDSCH. For example, the BS may transmit the activation command 314 in a MAC-CE carried by the PDSCH. The PDSCH may be associated with, and preceded by, a PDCCH including downlink control information (DCI) 312 scheduling the PDSCH. In response to receiving the activation command 314, the UE transmits an acknowledgement signal (ACK) 316 indicating that the activation command 314 has been received. The UE transmits the ACK 316 according to a HARQ communication protocol after a first delay period 332. The first delay period 332 may be referred to as $T_{HARQ}$, and may be representative of the timing between the DL data transmission including the activation command 314 and the transmission by the UE of the acknowledgement 316. In some aspects, the first delay period 332 may be predetermined based on a certain wireless communication protocol. In some other aspects, the first delay period 332 can be based on UE capabilities (e.g., the time associated with the UE decoding the DL data including the activation command 314).

In response to the activation command 314, the UE begins monitoring for RSs on the Scell 320. In particular, the UE may monitor for synchronization signal blocks (SSBs) on the Scell 320. The BS transmits, to the UE via the Scell 320, a plurality of SSB bursts 322 associated with an SSB periodicity 302. The BS may transmit one SSB or SSB burst every 20 ms, 40 ms, 80 ms, 160 ms, or any suitable periodicity. FIG. 3 illustrates three time stages or phases 324, 326, 328 associated with the Scell activation. It will be understood that the phases 324, 326, 328 are merely illustrative and may be modified without departing from the scope of the present disclosure.

During a first phase or deactivated phase 324, the Scell 320 is deactivated, or inactive, and the UE may not be monitoring for SSBs on the Scell 320. In this regard, during the deactivated phase 324, a first SSB burst 322a, including a first SSB $322a_1$ and a second SSB $322a_2$, and a second SSB burst 322b are transmitted on the Scell 320, but may not be detected or measured by the UE. The first SSB $322a_1$ may have a first SSB index (e.g., SSB #0), and the second SSB $322a_2$ may have a second SSB index (e.g., SSB #1). The BS may be configured to utilize a set of transmit beams for transmission. Each beam in the set of transmit beams may be directed towards a different spatial direction, which may be referred to as beam direction. The BS may transmit SSBs by sweeping through the set of transmit beams to reach UEs located at various locations or directions towards the BS. In some instances, the BS may transmit the first SSB $322a_1$ using a first transmit beam from the set of transmit beams, and may switch to transmit the second SSB $322a_2$ using a second, different transmit beam from the set of transmit beams. It will be understood that, although only two SSBs are shown in each SSB burst, fewer or more SSBs may be transmitted in each burst than what is shown in FIG. 3, such as 1, 3, 4, 6, 8, 10, 12, 16, 32, 64, or any other suitable number of SSBs, both greater or smaller, for example, based on a number of transmit beams in the set of transmit beams.

The BS transmits the first SSB burst 322a before the activation command 314 has been transmitted to the UE. The BS transmits the second SSB burst 322b after the activation command 314, but before the UE has started monitoring for SSBs on the Scell 320. In some aspects, there may be a delay 333 between transmitting the ACK 316 and the start of monitoring for SSBs by the UE. In some aspects, the delay 333 may be based on the UE capability of the necessary processing time for starting the Scell activation procedure. In one aspect, the delay 333 may be 3 ms. However, it will be understood that the delay 333 can be any suitable value, including 1 ms, 2 ms, 5 ms, or 7 ms, or 1 slot, 2 slots, 3 slots, of a particular sub-carrier spacing (SCS), or any other suitable value, both greater or smaller.

After the delay 333, the UE monitors for SSBs 322 on the Scell 320 during an activation phase 326. The UE detects the first SSB burst 322 that occurs during this phase 326, which is the third SSB burst 322c in FIG. 3. In some aspects, the UE may have beam information associated with the Scell 320. For instance, in some aspects, all cells in a frequency band are co-located and the BS may transmit a certain SSB (e.g., the SSBs 322) in each cell using the same transmit beam. In other words, there is a QCL relationship between an SSB with an SSB index 1 in one cell and an SSB with an index 1 in another cell within the same band. Accordingly, if the UE acquired beam information from one cell, the UE may apply the same beam information to another cell in the same frequency band. In other words, the UE may select a preferred transmit beam of the BS in a first cell, and may assume that the same transmit beam will be a preferred transmit beam in a second cell in the same frequency band. Similarly, if the UE determines that a certain receive beam may provide optimal performance with the preferred transmit beam when operating in the first cell, the UE may assume that the same receive beam may provide optimal performance when operating in the second cell.

Accordingly, in one aspect, the BS may have activated another cell for the UE that is on a same frequency band as the Scell 320. The BS may determine, based on beam information (e.g., QCL information, TCI state) associated with the active cell, corresponding beam information for the Scell being activated. For instance, the BS may have knowledge of which SSB is a preferred SSB for the UE, and may activate a TCI state the same as the TCI state corresponding to the preferred SSB in the other activated cell when activating the Scell 320. In some aspects, the BS may indicate the beam information for the Scell to the UE via a MAC-CE in a PDSCH, or DCI in a PDCCH. For example, referring to FIG. 3, the BS may indicate a TCI state associated with the Scell 320 in a DCI transmitted on the Pcell 310. The UE may then monitor for a first SSB in a given SSB burst 322 (e.g., $322a_1$) based on a QCL configuration determined based on the received TCI, where the first SSB $322a_1$ in the SSB burst 322 is associated with the first beam.

As explained above, each SSB of the bursts 322 includes a plurality of reference signals, including primary synchronization signals (PSS), secondary synchronization signals (SSS), and physical broadcast channel demodulation reference signals (PBCH-DM-RS). The UE can perform measurements on one or more of these reference signals to perform various procedures associated with activating the Scell 320. For instance, the UE may perform AGC and/or fine tracking (e.g., time and/or frequency tracking) to tune the receiver at the UE in preparation of operating in the Scell 320. The delay 335 is the time or delay between the beginning of the SSB monitoring by the UE and the reception of the SSB of the third SSB burst 322c. The UE may perform fine tracking based on the SSB burst 322c. In one aspect, the delay 335 may be referred to as $T_{FirstSSB}$, or $T_{FirstSSBMax}$, and may be described as the time to the end of the first complete SSB burst 322 indicated by the SMTC after the delay 332 ($T_{HARQ}$)+the delay 333. The UE may perform measurements based on the detected SSB during the delay 337. Once the measurements have been performed, the Scell 320 may be activated such that the UE and/or BS can communicate via the Scell 320 during the activated phase 328.

The second delay 334 is representative of the total period from the transmission of the ACK signal 316 to the end of the delay 337, and includes the delays 333, 335 ($T_{FirstSSB}$), and 337. In one aspect, the second delay 334 may be referred to as $T_{ActivationTime}$. In one aspect, the delay 333 may be 3 ms, and the delay 337 may be 2 ms. Accordingly, in some aspects, $T_{ActivationTime}$ may be $T_{FirstSSB}$+5 ms, where 5 ms is the sum of the delays 333 and 337. In some aspects, the delays 333 and/or 337 may be shorter than the predetermined or specified values, based on time periods associated with the UE processing, according to its implementations and/or configurations. The delay 335 ($T_{FirstssB}$) may be variable and based on the SSB periodicity 302 and the timing of the activation command 314.

The Scell 320 may be considered activated once the UE can report a valid channel state information (CSI) report based on the channel measurements to the BS. In this regard, the BS may configure the UE with channel measurement resources and transmits a reference signal 327 in the channel measurement resources. The UE performs measurements on the reference signal 327 and transmits a measurement report 329. Although FIG. 3 illustrates the measurement report 329 being transmitted over the Scell 320, it should be understood that in other examples the measurement report 329 may be transmitted over another serving cell, for example, the Pcell 310 or another active Scell. In one aspect, the channel measurement resources may be channel state information-reference signal (CSI-RS) resources, the reference signal 327 may be a CSI-RS, and the report 329 may be a channel state information (CSI) report. The delay 336, which is the time period from the end of the delay 334 and the transmission of the report 329, may be referred to as $T_{CSIReporting}$. The delay 334 may vary depending on the configuration of the CSI-RS resources. The activated phase 328 may begin at the end of the delay 334. Thus, in some aspects a total Scell activation delay is determined based on the transmission of the activation command 314 and the transmission of the measurement report 329, and includes the delays 332, 334, and 336. In some aspects, the Scell activation delay may be measured in numbers of slots, and be determined based on the following relationship:

$$SCell\ activation\ delay = \frac{T_{HARQ} + T_{ActivationTime} + T_{CSIReporting}}{Slot\ Length}$$

As explained above, one significant portion of the total activation delay is $T_{ActivationTime}$ (334), and particularly the $T_{FirstSSB}$ portion (335) of $T_{ActivationTime}$ 334. The length of $T_{FirstSSB}$ 335 is, in part, based on the SSB periodicity 302 which may be relatively sparse. The present disclosure provides mechanisms for reducing the Scell activation delay using one or more temporary reference signals in place of at least one SSB in an Scell activation procedure. For example, a BS may trigger a temporary reference signal, such as an NZP-CSI-RS or a TRS, and indicate the temporary RS trigger (e.g., slot index) to the UE. The BS may transmit a temporary RS based on beam information (e.g., QCL information, TCI state) associated with a certain SSB or a certain SSB index. The UE may then detect the temporary RS based on the indication and the beam information (e.g., QCL information, TCI state), and perform one or more cell activation protocols, such as frequency tracking, time tracking, AGC, and/or cell detection. Accordingly, $T_{ActivationTime}$ 334, and consequently the total Scell activation delay, are reduced.

Figure 4A:
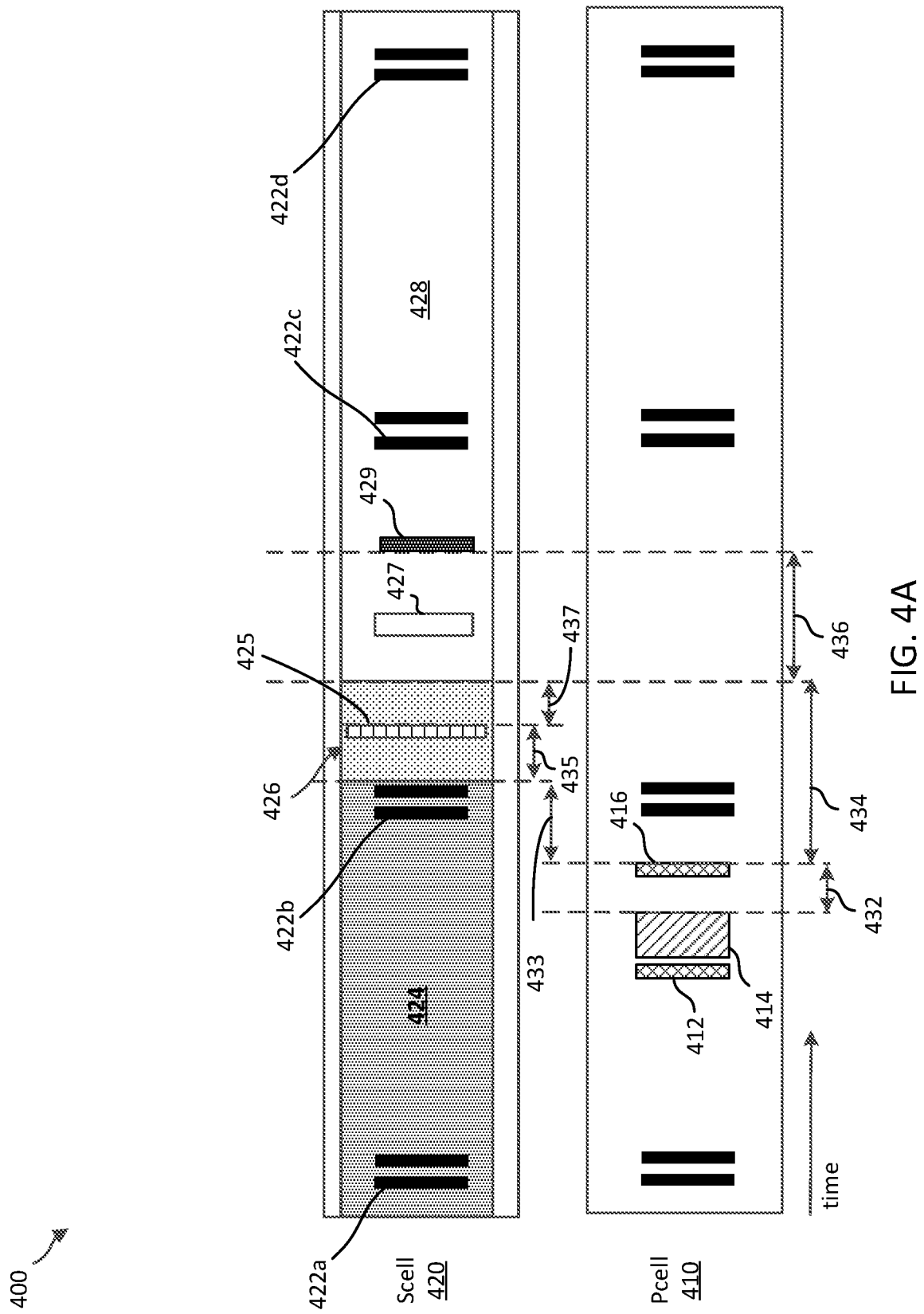
FIG. 4A illustrates an Scell activation scheme using one or more temporary reference signals (RSs) according to some aspects of the present disclosure.
Figure 4B:
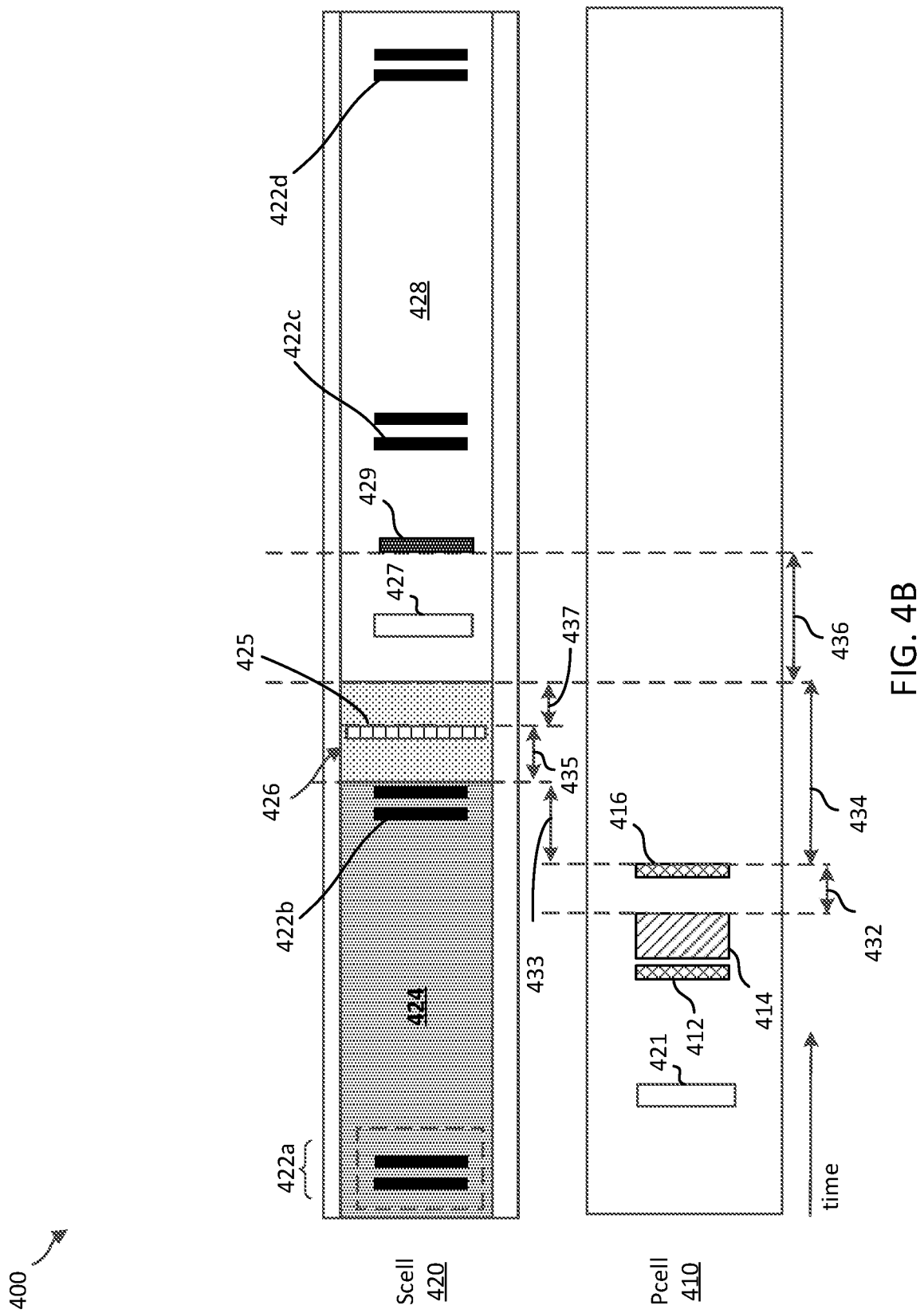
FIG. 4B illustrates an Scell activation scheme using one or more temporary reference signals (RSs) according to some aspects of the present disclosure.

FIGS. 4A and 4B illustrate Scell activation schemes 400a, 400b performed by a BS (e.g., BS 105) and a UE (e.g., UE 115). A BS and a UE may perform the Scell activation schemes 400a, 400b such that the UE can transmit DL data and/or UL data transmission on a different serving cell in a CA communication scenario. A primary cell or Pcell 410 is an anchor serving cell that is activated such that the UE can receive control information, network configurations, and DL data from the BS. As explained above, in order to offload DL and/or UL traffic from the Pcell 410, the BS can activate a secondary cell (Scell) 420. Activating the Scell 420 includes performing measurements on reference signals (RSs) transmitted on the Scell 420 for automatic gain control (AGC), frequency tracking, time tracking, and/or cell detection. The total time or activation delay associated with activating the Scell 420 may be a sum of individual delay periods 432, 434, 436. The delay period 434 includes delays 433, 435, 437. The scheme 400 of FIG. 4 involves using at least one temporary reference signal (RS) 425 to reduce the total activation delay associated with activating the Scell 420. In that regard, the BS may transmit the temporary RS 425 to the UE on the Scell 420 and indicate the slot/location of the temporary 425 to the UE such that the UE can perform measurements and/or detection protocols using the temporary RS 425.

Similar to the scheme 300 shown in FIG. 3, The BS periodically transmits SSB bursts 422 on the Scell 420 at a plurality of phases 424, 426, 428 of the Scell activation procedure. The first and second SSB bursts 422a, 422b are transmitted during a deactivated phase 424, and the third and fourth SSB bursts 422c, 422d are transmitted during an activated phase 428. A temporary reference signal 425 that is different from an SSB is transmitted during an intermediate or activation phase 426. Each SSB bursts comprises a set of SSBs. Each SSB in the set is associated with a TCI state, and each TCI state may correspond to a transmit beam or transmit characteristic at the BS. In other words, the BS may transmit each SSB in the set using a certain transmit beam. Although FIGS. 4A and 4B show two SSBs in each SSB burst 422, it will be understood that other numbers of SSBs may be transmitted in each SSB burst 422 without departing from the scope of the present disclosure. For example, in some aspects, the BS may transmit 1, 3, 4, 6, 8, 10, 12, 16, 32, 64, or any other suitable number of SSBs in each SSB burst 422, both greater or smaller.

In the schemes 400a, 400b, the SSB bursts 422 are transmitted on both the Pcell 410 and the Scell 420. In some aspects, respective SSB bursts in each cell may be transmitted in a same slot such that the SSB bursts 422 are aligned in time. In one aspect, the Scell 420 may operate in a same frequency band as the Pcell 410. In other aspects, the Scell 420 may operate in a different frequency band than the Pcell 410.

On the Pcell 410, the BS transmits control information 412 in a PDCCH to schedule DL data including an Scell activation command 414 in a PDSCH. In response to receiving the activation command 414, the UE transmits an acknowledgement (ACK) 416 associated with the activation command 414. The ACK 416 is transmitted after a first delay period 432, which may be referred to as $T_{HARQ}$. Following the transmission of the acknowledgement 416, a second delay period 434 begins, which may be referred to as $T_{ActivationTime}$. The second delay period 434 includes three delays 433, 435, 437. In one aspect, delays 433 and 437 may be based on UE capabilities. In one example, the delay 433 is 3 ms, and the delay 437 is 2 ms. However, the delays 433 and 437 may be longer or shorter, such as 1 ms, 2 ms, 3 ms, 5 ms, 7 ms, or any other suitable value, both greater or smaller. The delay 435 is representative of the time period between the end of the delay 433 and the reception of the temporary RS 425 by the UE. In one aspect, the delay 435 may be referred to as $T_{TempRS}$.

The BS transmits the temporary RS 425 to the UE on the Scell 420 after transmitting the activation command 414. In some aspects, the time (e.g., slot) in which the temporary RS 425 is transmitted is based on UE capabilities and/or network configurations. In some aspects, the BS transmits the temporary RS 425 in response to receiving the ACK signal 416 from the UE. The temporary RS 425 may be different from an SSB, and may be suitable for the UE to perform one or more procedures associated with the Scell activation, including time tracking, frequency tracking, and/or AGC. Since the temporary RS 425 is not part of an SSB, the BS can transmit the temporary RS 425 at an earlier time than a next scheduled SSB 422c, for example between SSBs 422b and 422c as shown, and can be transmitted more frequently than the SSBs 422, the duration of the delay 435 is reduced compared to the delay 335 shown in FIG. 3. Accordingly, the second delay 434 is also reduced, as well as the total Scell activation delay period. Thus, the Scell 420 is activated more quickly in the scheme 400 compared to the scheme 300 shown in FIG. 3.

Referring to FIG. 4A, the BS transmits the temporary RS 425 based on or in accordance with beam information. The beam information may be determined by the BS based on beam information associated with an SSB on an active cell operating in a same frequency band as the Scell 420. In one aspect, the BS may indicate, to the UE, the beam information associated with the temporary RS 425. For example, the BS may transmit a MAC-CE in a PDSCH on the Pcell 410, or on another active cell operating in the same frequency band as the Scell 420, where the MAC-CE indicates the beam information (e.g., TCI state and/or QCL assumption information) for the temporary RS 425. In another aspect, the UE may identify the beam information associated with the temporary RS 425 based on beam information associated with an SSB transmitted on an active cell in the same frequency band as the Scell 420. For instance, the UE may have selected a preferred SSB (e.g., with an SSB index #0) for monitoring in the other active serving cell in the same frequency band, and the BS may have knowledge of the TCI state (associated with the SSB index #0) is activated for the UE in the active serving cell. Accordingly, the BS may activate the same TCI state in the Scell 420, and the UE may assume the BS will activate the same TCI state in the Scell 420.

In some aspects, there may be no active serving cell for the UE that operates in the same frequency as the Scell 420 to be activated. The Scell activation scheme 400b may be used when there is no active serving cell on the same frequency band as the Scell 420, but the Scell 420 has been previously activated for the UE such that the Scell 420 is known to the UE. In the scheme 400b, the UE may perform measurements of one or more SSBs of an SSB burst (e.g., 422a) before receiving the activation command 414. For example, the UE may measure the receive signal power or strength of the SSBs of an SSB burst 422.

In the illustrated example, the SSB burst 422 may include two SSBs (e.g., SSB #0 and SSB #1), each transmitted by the BS in a different transmit beam direction. For instance, the UE may obtain a first measurement for SSB #0 and a second measurement for SSB #1. The UE may transmit a measurement report 421 to the BS based on the measurements. In some aspects, the measurement report 421 indicates the measurements for one or more of the individual SSBs. For example, the measurement report 421 may include the first measurement for the SSB #0 and the second measurement for the SSB #1. In some aspects, the BS may determine the preferred beam based on the measurement report 421. For example, the BS may determine a preferred transmit beam for communicating with the UE based on the measurement report 421. In some instances, the BS may determine the preferred transmit beam based on a highest measurement between the first measurement and the second measurement. Additionally or alternatively, the BS may determine the preferred transmit beam based on a lowest interference measurement and/or a highest SINR among the transmit beams, and/or a lowest SSB index among SSBs with measurements satisfying a certain threshold. In response to receiving the measurement report 421, the BS may activate a TCI state for the preferred beam on the Scell 420. For instance, the BS may transmit the temporary RS 425 using a transmit beam corresponding to the activated TCI state.

In other aspects, the UE may determine the preferred beam based on the measurements, and indicate the preferred beam in the measurement report 421. For example, the UE may identify and indicate the SSB index that provides the UE with the highest receive signal measurement. In response to receiving the measurement report 421, the BS may activate a TCI state corresponding to the indicated SSB index on the Scell 420. For instance, the BS may transmit the temporary RS 425 using a transmit beam corresponding to the activated TCI state.

Referring to FIGS. 4A and 4B, the temporary RS 425 may be transmitted in a slot. The temporary RS 425 may be associated with an NZP-CSI-RS resource set index indicating a set of time/frequency resources. The BS may indicate a trigger and/or configuration (e.g., the slot and/or NZP-CSI-RS resource set index) of the temporary RS 425 in control information or in DL data. For example, in one aspect, the trigger and/or configuration of the temporary RS 425 may be indicated in a media access control control element (MAC-CE) transmitted in a PDSCH. In some instances, the BS may indicate the temporary RS trigger and/or configuration and the activation command 414 in the same MAC-CE. In some other instances, the BS may indicate the temporary RS trigger and/or configuration in a different MAC-CE than the MAC-CE carrying the activation command 414. In another aspect, the BS indicates trigger and/or configuration of the temporary RS 425 in downlink control information (DCI). For example, the DCI may be the control information 412 that schedules the activation command 414. For example, the BS may transmit the DCI indicating the temporary RS trigger and/or configuration in a PDCCH that schedules the PDSCH that carries the activation command 314. In other aspects, the BS may transmit the DCI indicating the temporary RS trigger and/or configuration in a separate DCI from the DCI that schedules the activation command 314.

In one aspect, the schemes 400a and 400b of FIGS. 4A and 4B may be used to activate the Scell 420 where at least one cell, such as the Pcell 410, is an active serving cell in the same frequency band as the Scell 420 and/or where the Scell 420 is known to the UE (e.g., previously activated or measured not earlier than a certain timing, e.g., 5 times of a DRX cycle). Under these circumstances, the number of cell measurement and detection protocols associated with the temporary RS for performing the Scell activation procedure may be reduced or limited. For example, if another active serving cell is in the same band as the Scell 420, the UE may utilize measurements from SSBs measured on the other active cell for receiver gain control. In the present example, the temporary RS 425 may be used for frequency tracking and time tracking (fine tracking) only. Accordingly, AGC may not be performed using the single temporary RS 425 in the schemes 400a, 400b. However, as explained further below, in other aspects, the UE may perform additional measurement and/or detection protocols based on the temporary RS 425, such as AGC. In other aspects, the BS may transmit additional temporary RSs used for the additional measurement and/or detection protocols.

The temporary RS 425 may be an NZP-CSI-RS. In one aspect, the temporary RS 425 is a tracking reference signal (TRS), which may be sparse reference signals that facilitate time and/or frequency tracking at a UE. In some instances, a BS may configure a NZP-CSI-RS resource set with a higher-layer parameter trs-info to serve as TRSs. In one aspect, the temporary RS 425 may include 2 NZP-CSI-RS resources in a slot, or 4 NZP-CSI-RS resources in two consecutive slots. A TRS may span over the bandwidth of the DL bandwidth part (BWP) which will be active when the Scell 420 is activated. For example, the TRS may span the DL BWP configured with first-active-DL-BWP-id, which may be configured by the network. In some aspects, the temporary RS 425 may occupy a single slot. However, in other aspects, the temporary RS 425 may occupy resources over more than one slot, such as two consecutive or non-consecutive slots. Additionally, in some instances, a temporary RS 425 may occupy more than one symbol (e.g., symbols 2 and 4) within a slot. In one aspect, the temporary RS 425 may occupy two OFDM symbols within a slot. However, in other aspects, the temporary RS 425 may occupy 1, 2, 4, 5, 6, or any other suitable number of OFDM symbols within a slot. In some aspects, there may be a gap between individual temporary RSs or temporary RS bursts. The gap may be at the OFDM symbol-level, the slot-level, or the subframe-level. In some aspects, the gap may be configurable by the BS via higher layer configurations, and/or may be based on reported UE capability for possible gap lengths.

After the UE receives the temporary RS 425 and the second delay period 434 ($T_{ActivationTime}$) has ended, a CSI-RS 427 is transmitted by the BS during in the activated phase 428. The UE may perform measurements based on the CSI-RS 427, and transmit a measurement report 429 to the BS. Although FIG. 4 illustrates the measurement report 429 being transmitted over the Scell 420, it should be understood that in other examples the measurement report 429 may be transmitted over another serving cell, for example, the Pcell 410 or another active Scell. The third delay period 436 is associated with the time between the end of the second delay 434 and the transmission of the report 429. The third delay 436 may be referred to as $T_{CSIReporting}$, in some aspects. As similarly explained above in relation to FIG. 3, the third delay 436 can vary depending on the resource configuration for the CSI-RS 427.

As explained above, because the delay associated with receiving the RS ($T_{ActivationTime}$) is reduced compared to the scheme 300 shown in FIG. 3, the entire Scell activation delay can be significantly reduced. The scheme 400 may be used, for instance, if another active serving cell, such as the Pcell 410, is operating in a same frequency band as the Scell 420, or where the Scell 420 is known to the UE. However, in some aspects, there may not be another active cell operating on the same frequency band as the Scell 420, and the Scell 420 may be unknown to the UE. For example, in some instances, only the Pcell 410 may be activated, and the Pcell 410 may operate in a different frequency band than the Scell 420. For example, in some aspects, the Pcell 410 may operate in FR2, and the Scell 420 may operate in FR1 or vice versa. The present disclosure also provides mechanisms for activating an Scell using temporary RSs, where no other active serving cells are operating in the same frequency band as the Scell to be activated and the Scell to be activated is unknown to the UE. Thus, when the BS and the UE utilize beamforming for communications, there may not be any beam information (e.g., a preferred transmit-receive beam pair) established between the BS and the UE.

In some aspects, to activate an unknown Scell, a UE may perform AGC and/or SSB detection using 3 SSB cycles. When operating in FR2, the BS may sweep through a set of transmit beams during each SSB cycle, for example, by transmitting a set of SSBs, where each SSB is transmitted using a different transmit beam. The UE may also select a preferred beam during the 3 SSB cycles. Subsequently, the UE may perform fine tracking (e.g., including time and/or frequency tracking) using one SSB transmitted by the BS using the selected or preferred transmit beam. As an example, if the UE can utilize 8 receive beams for receptions, the cell activation time may be as long as 8×3 (=24) SSB cycles plus one SSB so that the UE can sweep through the 8 receive beams to identify a best transmit-receive beam pair for communicating with the BS.

Figure 5A:
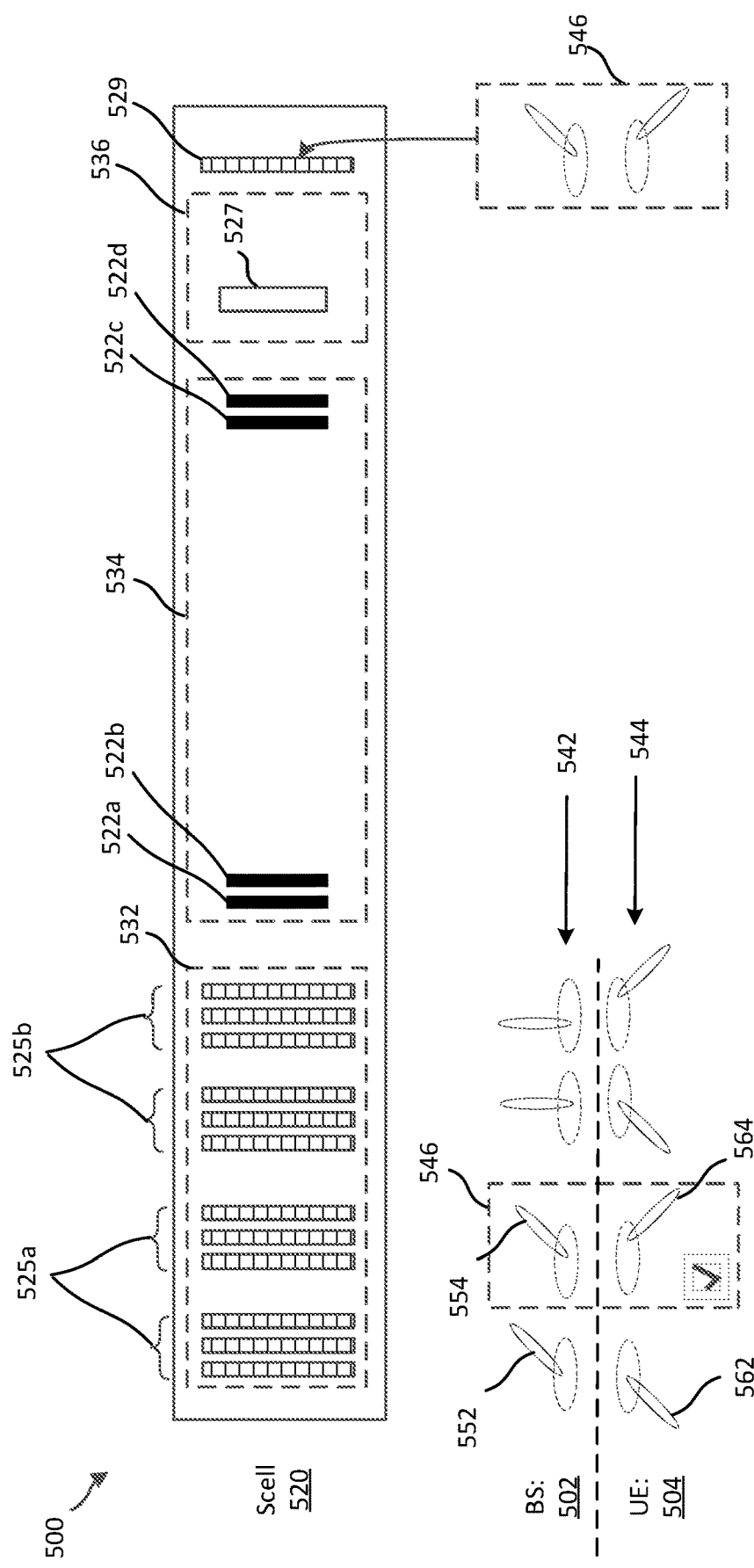
FIG. 5A illustrates an Scell activation scheme using temporary RS bursts according to some aspects of the present disclosure.
Figure 5B:
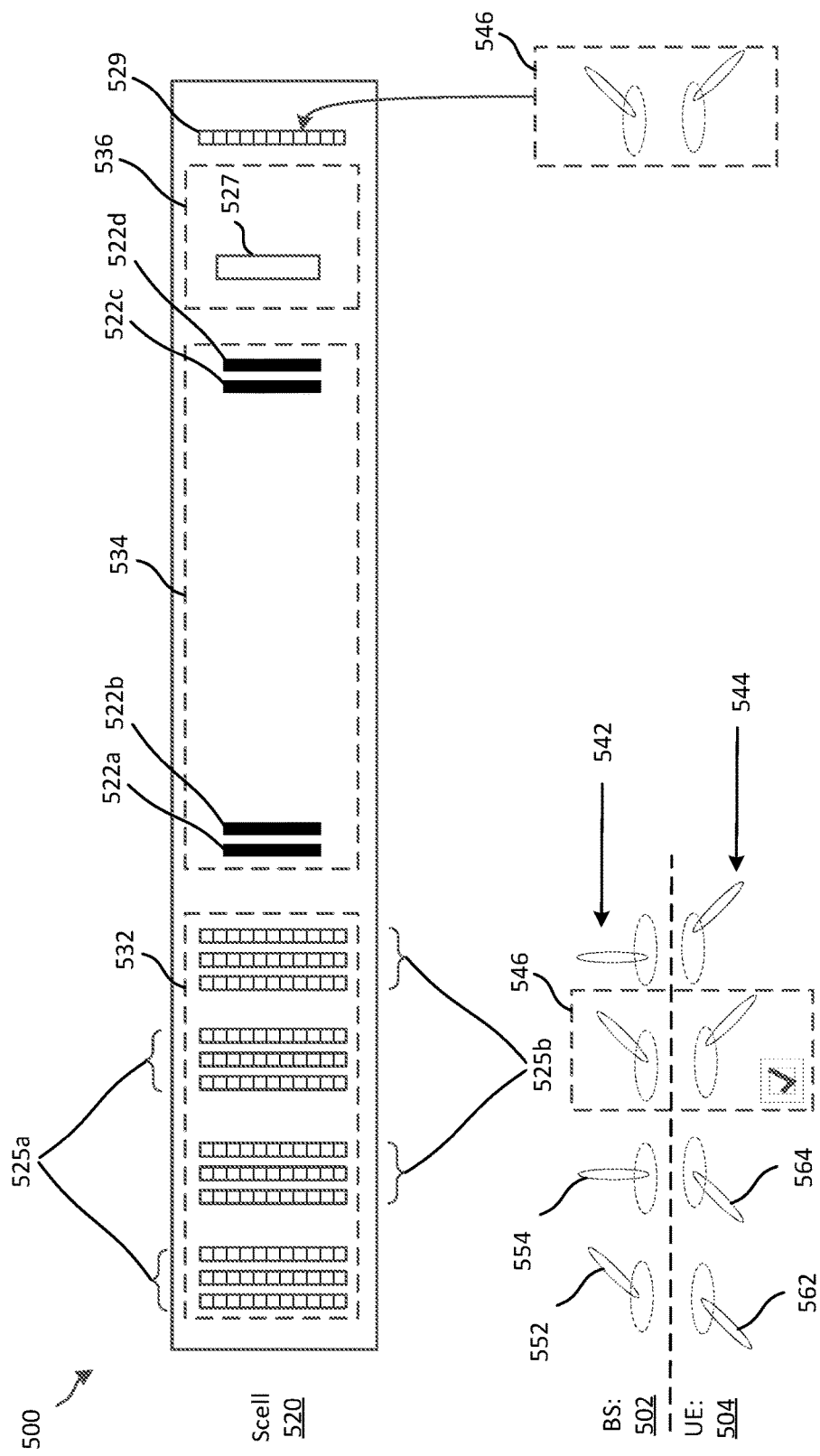
FIG. 5B illustrates an Scell activation scheme using temporary RS bursts according to some aspects of the present disclosure.

FIGS. 5A and 5B illustrate Scell activation schemes 500a, 500b performed by a BS 502 (e.g., BS 105) and a UE 504 (e.g., UE 115), according to aspects of the present disclosure. A BS 502 and a UE 504 may perform the Scell activation schemes 500a, 500b such that the UE can transmit DL data and/or UL data transmission on a previously unknown serving cell in a CA communication scenario. In FIGS. 5A and 5B, a primary cell or Pcell 510 is an anchor serving cell that is activated such that the UE can receive control information, network configurations, and DL data from the BS. As will be further explained below, the schemes 500a, 500b of FIGS. 5A and 5B involve using a plurality of temporary RS bursts 525 in place of at least one SSB burst 522 to reduce the total activation delay associated with activating the Scell 520. FIGS. 5A and 5B illustrate signals (e.g., temporary RS bursts 525, SSBs 522) transmitted in the Scell 520 during an activation period, as well as an illustration of the Tx beams at a BS 502 (shown by 542) for transmitting the different temporary RS bursts 525 and Rx beams at a UE 504 (shown by 544) for receiving the different temporary RS bursts 525.

At a high level, in the schemes 500a and 500b, the BS can transmit temporary RS bursts in place of the SSBs to enable the UE to perform AGC and beam selection in a shorter time period. As similarly explained above, the temporary RS bursts are not part of an SSB, and thus may not be restricted to the SSB transmission schedule or periodicity. However, in order to facilitate beam selection in relation to the set of SSBs, the BS may associate the temporary RS bursts with the set of SSBs. For instance, each temporary RS burst can be associated with a TCI state corresponding to an SSB in the set of SSBs. In other words, the BS may assign a TCI state to each temporary RS burst and transmit the temporary RS burst using a transmit beam corresponding to the assigned TCI state. Hence, the UE can perform AGC and/or beam selection based on the temporary RS bursts, and may subsequently receive an SSB based a QCL relationship between the selected temporary RS burst and the SSBs. Accordingly, the AGC and/or beam selection time can be reduced, and the UE may subsequently monitor an SSB (for cell detection) based on the selected or preferred transmit-receive beam pair and perform fine tracking using an additional SSB based on the selected or preferred transmit-receive beam pair.

The BS 502 transmits a plurality of temporary RS bursts 525 associated with different beam properties corresponding to a set of SSBs (or SSB indices) in a temporary RS burst period. The BS may transmit the temporary RS bursts 525 in groupings corresponding to different SSB indices. For simplicity of discussion and illustration, FIG. 5A illustrates a scenario where the BS 502 transmits a set of SSB including two SSBs (e.g., an SSB with an SSB index 0 and an SSB with an SSB index 1), each using a different transmit beam, and the UE 504 utilizes two receive beams for reception. However, it should be understood that in other examples the BS may transmit a set of SSBs including more than 2 SSBs (e.g., 4, 5, 6, 7, 8, 16, 32, 64 or more) and the UE may utilize any suitable number of receive beams (e.g., 3, 4, 5, 6, 7, 8 or more). As an example, in the scheme 500a of FIG. 5A, the BS 502 transmits a first subset of bursts 525a corresponding to a first SSB index (e.g., SSB #0), and a second subset of bursts 525b corresponding to a second SSB index (e.g., SSB #1). Each SSB index may be associated with different beam properties, such as a TCI state, and/or a Tx beam at the BS.

In FIG. 5A, the BS 502 transmits each temporary RS burst 525 with three temporary RSs, and two bursts 525 associated with each SSB index. The three temporary RSs in each burst 525 may be based on the UE utilizing 3 SSBs for AGC training as discussed above. The first two consecutive bursts 525 are associated with the first subset 525a, which is associated with a first SSB index (e.g., SSB #0), and the second two consecutive bursts are associated with the second subset 525b, which is associated with a second SSB index (e.g., SSB #1). However, it will be understood that other configurations are also contemplated by the present disclosure, including configurations having fewer or more temporary RSs in each burst 525, configurations having fewer or more bursts associated with each SSB index, and/or configurations in which the bursts are associated with fewer or more SSB indices.

In the scheme 500a, the BS 502 may fix a transmit beam while the UE 504 sweeps through a set of receive beams at the UE 504. For example, the BS 502 transmits a temporary RS burst 525 associated with a first SSB index (e.g., SSB #0) using a transmit beam 552 (e.g., associated with a TCI state corresponding to the SSB #0) consecutively for K times, where K represents the number of receive beams at the UE. In the illustrated example, K is 2. In this way, the UE 504 may sweep through the K receive beams and obtain a measurement for each receive beam (e.g., receive beam 562 and 564). In other words, the UE 504 may obtain a first receive signal measurement (e.g., L1-RSRP) for a temporary RS burst 525 transmitted by the BS 502 using the transmit beam 552 and received by the UE 504 using the receive beam 562. The UE 504 may obtain a second receive signal measurement (e.g., L1-RSRP) for a temporary RS burst 525 transmitted by the BS 502 using the transmit beam 552 and received by the UE 504 using the receive beam 564.

Subsequently, the BS 502 may switch to transmit a temporary RS burst 525 associated with a second SSB index (e.g., SSB #1) using a transmit beam 554 (e.g., associated with a TCI state corresponding to the SSB #1) consecutively for K times. Similarly, the UE 504 may sweep through the K receive beams and obtain a measurement for each receive beam (e.g., receive beam 562 and 564). For instance, the UE 504 may obtain a third receive signal measurement (e.g., L1-RSRP) for a temporary RS burst 525 transmitted by the BS 502 using the transmit beam 554 and received by the UE 504 using the receive beam 562. The UE 504 may obtain a fourth receive signal measurement (e.g., L1-RSRP) for a temporary RS burst 525 transmitted by the BS 502 using the transmit beam 554 and received by the UE 504 using the receive beam 564.

In general, the BS 502 may transmit a set of M number of temporary RS bursts associated with a set of M number of SSBs (in an SSB burst) by transmitting each temporary RS burst K number of times consecutively to allow the UE 504 to sweep through the set of K receive beams at the UE 504. With regard to the correspondence between a given temporary RS burst 525 and SSB index, the Floor(n/M)-th temporary RS burst 525 is associated with the M-th SSB in an SSB burst where M is the number of SSBs in an SSB burst.

The UE 504 may determine, based on measurements (e.g., the first, second, third, and fourth receive signal measurements) of the temporary RS bursts 525, a best or preferred beam pair. For instance, the UE 504 may select the beam pair with the highest receive signal measurements as the preferred beam pair. In FIG. 5A, the preferred beam pair 546 includes the first Tx beam 552 and the second Rx beam 564.

In some instances, the UE 504 may transmit a measurement report including the first, second, third, and fourth receive signal measurements to the BS 502. In response to receiving the measurement report from the UE 504, the BS 502 determines a preferred transmit beam (e.g., the transmit beam 554) for the UE 504 and activates a TCI state corresponding to the preferred transmit beam for the Scell 520. In some other instances, the UE 504 may indicate the preferred transmit beam in the measurement report. The BS 502 then transmits a temporary RS 529 on the Scell 520 following the measurement and report period based on the identified preferred beam pair 546. In this regard, the BS 502 may transmit the temporary RS 529 based on QCL information and/or a TCI state associated with the preferred beam pair. Further, the UE 504 may identify the temporary RS 529 based on the activated TCI state.

In the scheme 500*b* shown in FIG. 5B, the BS 502 may sweep a set of transmit beams at the BS 502 while the UE 504 performs measurement using a fixed receive beam (without beam sweep) at the UE 504. As shown, the BS 502 transmits a plurality of RS bursts 525 including a first subset 525*a* and a second subset 525*b*, similar to the scheme 500*a* shown in FIG. 5A. In FIG. 5B, first and third bursts 525 are associated with the first subset 525*a*, which is associated with a first SSB index (e.g., SSB #0), and the second and fourth bursts are associated with the second subset 525*b*, which is associated with a second SSB index (e.g., SSB #1). In other words, the BS 502 transmits a temporary RS burst 525 (the first burst of the first subset 525*a*) associated with a first SSB index (e.g., SSB #0) using a transmit beam 552 (e.g., associated with a TCI state corresponding to the SSB #0), and then switches to transmit a temporary RS burst 525 (the first burst of the second subset 525*b*) associated with a second SSB index (e.g., SSB #1) using a transmit beam 554 (e.g., associated with a TCI state corresponding to the SSB #1). During this time, the UE 504 may receive the temporary RS burst 525 associated with the first SSB index and the temporary RS burst 525 associated with the second SSB index using the same receive beam 562. The UE 504 may obtain a first receive signal measurement (e.g., L1-RSRP) for the temporary RS burst 525 transmitted by the BS 502 using the transmit beam 552 and received by the UE 504 using the receive beam 562. The UE 504 may obtain a second receive signal measurement (e.g., L1-RSRP) for the temporary RS burst 525 transmitted by the BS 502 using the transmit beam 554 and received by the UE 504 using the receive beam 562.

Subsequently, the BS 502 may repeat the transmit beam sweep to allow the UE 504 to utilize another receive beam 564 to perform the measurements. As shown, the BS 502 transmits a temporary RS burst 525 (the second burst of the first subset 525*a*) associated with a first SSB index (e.g., SSB #0) using a transmit beam 552 (e.g., associated with a TCI state corresponding to the SSB #0), and then switches to transmit a temporary RS burst 525 (the second burst of the second subset 525*b*) associated with a second SSB index (e.g., SSB #1) using a transmit beam 554 (e.g., associated with a TCI state corresponding to the SSB #1). The UE 504 switches to the receive beam 564 for reception. The UE 504 may obtain a third receive signal measurement (e.g., L1-RSRP) for the temporary RS burst 525 transmitted by the BS 502 using the transmit beam 552 and received by the UE 504 using the receive beam 564. The UE 504 may obtain a fourth receive signal measurement (e.g., L1-RSRP) for the temporary RS burst 525 transmitted by the BS 502 using the transmit beam 554 and received by the UE 504 using the receive beam 564.

The UE 504 may determine, based on measurements (e.g., the first, second, third, and fourth receive signal measurements) of the temporary RS bursts 525, a best or preferred beam pair. For instance, the UE 504 may select the beam pair with the highest receive signal measurements as the preferred beam pair. In FIG. 5B, the preferred beam pair 546 is associated with the third RS burst, which is in the first subset 525*a*. In some instances, the UE 504 may transmit a measurement report including the first, second, third, and fourth receive signal measurements to the BS 502. In response to receiving the measurement report from the UE 504, the BS 502 determines a preferred transmit beam (e.g., the transmit beam 554) for the UE 504 and activates a TCI state corresponding to the preferred transmit beam for the Scell 520. In some other instances, the UE 504 may indicate the preferred transmit beam in the measurement report. During a measurement and report period 536, the UE 504 transmits a measurement report 527 based on the measurements of the temporary RSs. The BS 502 then transmits a temporary RS 529 on the Scell 520 based on the identified preferred beam (e.g., the transmit beam 554) following the measurement and report period 536. In this regard, the BS 502 may transmit the temporary RS 529 based on QCL information and/or a TCI state associated with the preferred beam 554. Further, the UE 504 may identify the temporary RS 529 based on the activated TCI state.

In general, the BS 502 may transmit a set of M number of temporary RS bursts associated with a set of M number of SSBs (in an SSB burst) by transmitting each temporary RS burst in the set one time and repeat the transmission of the set of M temporary RS bursts K times. In this way, the UE 504 may receive and measure a set of M temporary RS bursts (transmitted consecutively by the BS 502) using one of the K receive beams before switching to another receive beam. In regard to the correspondence between a given temporary RS burst 525 and SSB index, the (n modulo M)-th temporary RS burst 525 is associated with the M-th SSB in an SSB burst where M is the number of SSBs in an SSB burst.

Similar to the schemes 300 and 400 shown in FIGS. 3 and 4, in the schemes 500*a* and 500*b*, the BS 502 periodically transmits SSB bursts 522 (a set of M SSBs) on the Scell 520. Each SSB in the setoff M SSBs may be associated with a different beam, similar to the temporary RS bursts 525. In that regard, each SSB 522 in the set of M SSBs may have an SSB index corresponding to a Tx beam (e.g., the transmit beams 552 and 554). In one aspect, the UE 504 may perform cell detection using one or more of the SSBs 522 transmitted in a cell detection period 534.

In one aspect, the UE 504 performs AGC based on the temporary RS burst 525 associated with the preferred beam pair 546, and performs frequency and/or time tracking using the temporary RS 529 transmitted after the measurement period. The temporary RS bursts 525 may be different from an SSB, and may be suitable for the UE 504 to perform one or more procedures associated with the Scell activation, including time tracking, frequency tracking, AGC, and/or cell detection.

Referring generally to FIGS. 5A and 5B, one or more of the temporary RSs of the RS bursts 525 may be associated with an NZP-CSI-RS resource set index indicating a set of time/frequency resources. The BS 502 may indicate a trigger or configuration (e.g., the slots and/or NZP-CSI-RS resource set index) of the temporary RSs 525 in control information, or in scheduled DL data. For example, in one aspect, the trigger or configuration of the temporary RS bursts 525 may be indicated in a MAC-CE transmitted in a PDSCH. In some instances, the BS 502 may indicate the temporary RS trigger and/or configuration and the activation command 514 in the same MAC-CE. In some other instances, the BS 502 may indicate the temporary RS trigger and/or configuration in a different MAC-CE than the MAC-CE carrying the activation command 514. In another aspect, the BS may indicate the trigger and/or configuration of the temporary RS bursts 525 in downlink control information (DCI). For example, the DCI may be the control information 512 associated with the activation command 514. For example, the DCI may be the scheduling DCI for the activation command 514. In other aspects, the DCI indicating the temporary RS trigger and/or configuration may be separate from the DCI that schedules the activation command 514.

One or more of the temporary RSs of the bursts 525 used in the schemes 500a, 500b may include NZP-CSI-RSs. In one aspect, one or more of the temporary RSs 525 is a tracking reference signal (TRS), which can be configured by an NZP-CSI-RS resource set configured with trs-info. In one aspect, one or more of the temporary RSs 525 may include 2 NZP-CSI-RS resources in a slot, or 4 NZP-CSI-RS resources in two consecutive slots. A TRS may span over the bandwidth of the DL bandwidth part (BWP) which will be active when the Scell 520 is activated. For example, the TRS may span the first-active-DL-BWP-id, which may be configured by the network.

After performing the frequency and/or fine tracking based on the temporary RS 529, the BS 502 may transmit a CSI-RS. The UE may perform measurements based on the CSI-RS, and transmit a measurement report to the BS 502.

Figure 6:
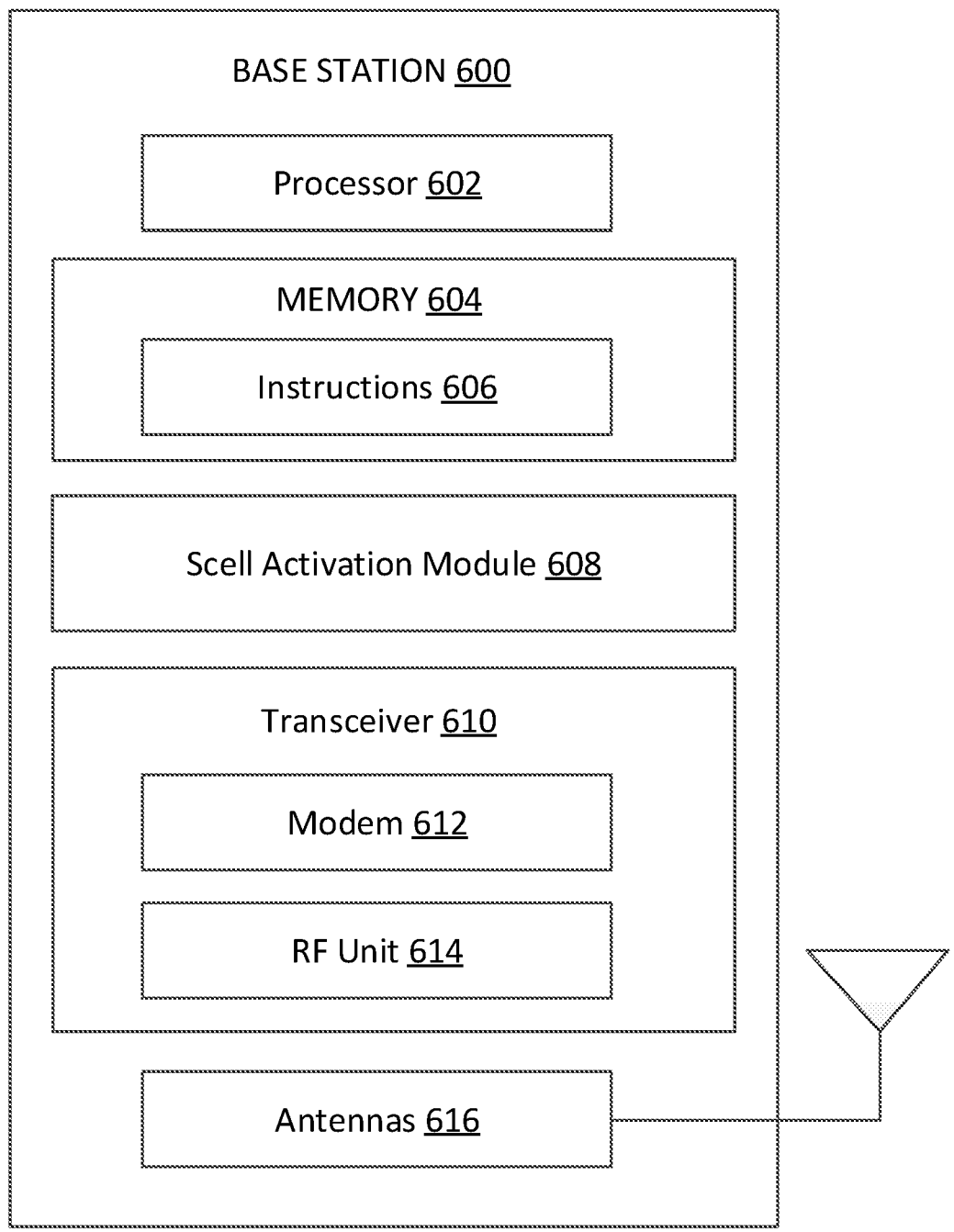
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. A shown, the BS 600 may include a processor 602, a memory 604, a Scell activation module 608, a transceiver 610 including a modem subsystem 612 and an RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 3-6, 9, and 11. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The Scell activation module 608 may be implemented via hardware, software, or combinations thereof. For example, the Scell activation module 608 may be implemented as a processor, circuit, and/or instructions 606 stored in the memory 604 and executed by the processor 602. In some examples, the Scell activation module 608 can be integrated within the modem subsystem 612. For example, the Scell activation module 608 can be implemented by a combination of software components (e.g., executed by a DSP or a general processor) and hardware components (e.g., logic gates and circuitry) within the modem subsystem 612.

The Scell activation module 608 may be used for various aspects of the present disclosure, for example, aspects of FIGS. 3, 4A, 4B, 5A, 5B, 8, and/or 10. In one aspect, the Scell activation module 608 is configured to transmit, to a user equipment (UE) via a first cell, an activation command to activate a second cell different from the first cell. In another aspect, the Scell activation module 608 is configured to transmit, to the UE via the second cell during a cell activation period, a first reference signal different from a synchronization signal block (SSB) based on beam information. In another aspect, the Scell activation module 608 is configured to receive, from the UE, a first measurement report based on the first reference signal. In another aspect, the Scell activation module 608 is configured to operate in the second cell based on the first measurement report.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PDCCH, PDSCH, SSBs, SIBs, initial BWP configurations, PDCCH common configurations, search space configurations) from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., UE capability reports, MSG1, MSG3, ACK/NACK, PUCCH, PUSCH) to the Scell activation module 608 for processing. The antennas 616 may include multiple antennas of similar or different designs in order to sustain multiple transmission links.

In some aspects, the processor 602 is configured to coordinate with the Scell activation module 608 to cause the transceiver 610 to: transmit, to a user equipment (UE) via a first cell, an activation command to activate a second cell different from the first cell; transmit, to the UE via the second cell during a cell activation period, a first reference signal different from a synchronization signal block (SSB) based on beam information; and receive, from the UE, a first measurement report based on the first reference signal. In another aspect, the processor 602 is configured to operate in the second cell based on the first measurement report.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
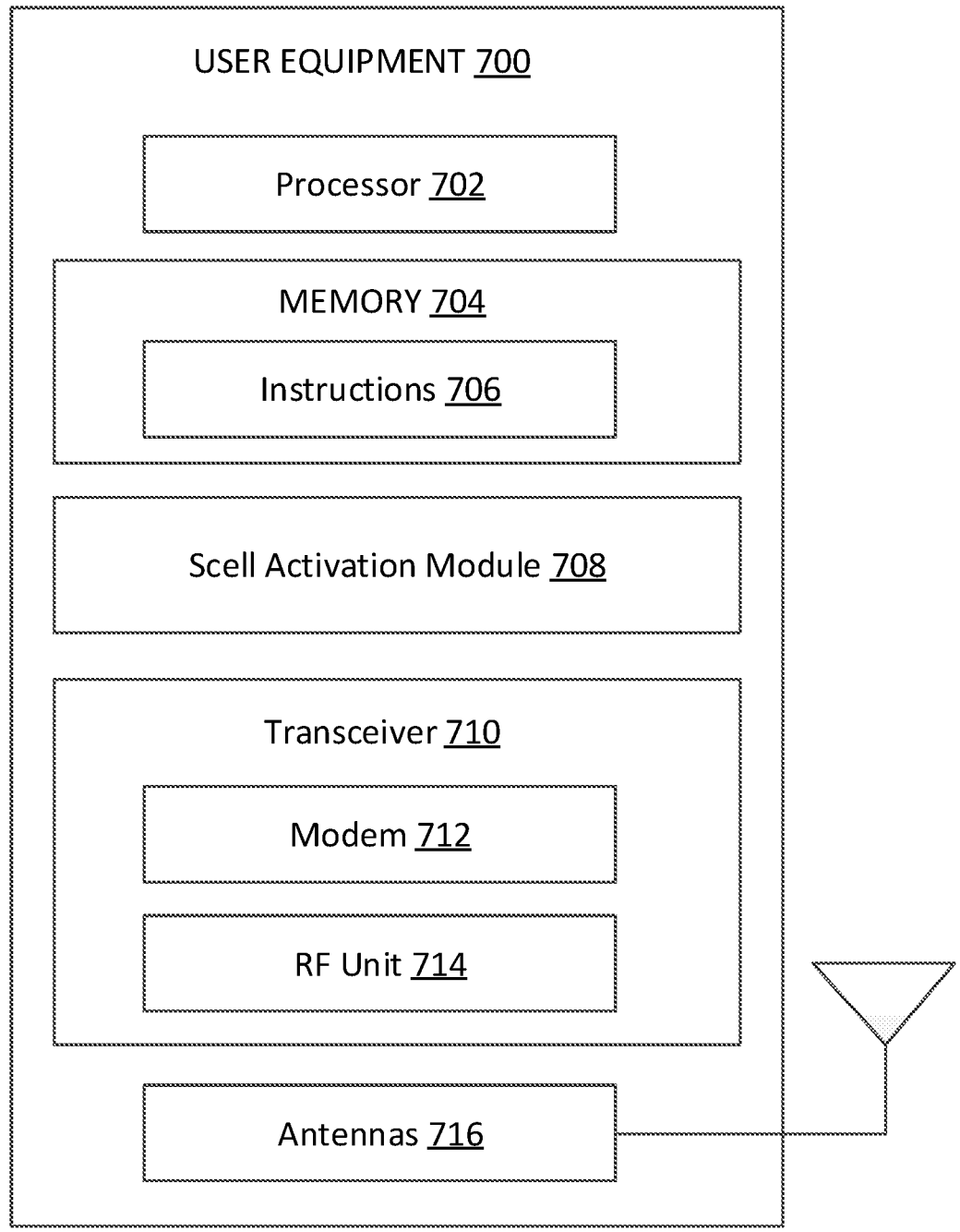
FIG. 7 is a block diagram of an exemplary user equipment (UE) according to some aspects of the present disclosure.

FIG. 7 is a block diagram of an exemplary UE 700 according to some aspects of the present disclosure. The UE 700 may be a UE 115 as discussed above with respect to FIG. 1. As shown, the UE 700 may include a processor 702, a memory 704, a Scell activation module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 3-7, 10, and 11. Instructions 706 may also be referred to as program code, which may be interpreted broadly to include any type of computer-readable statement(s) as discussed above with respect to FIG. 8.

The Scell activation module 708 may be implemented via hardware, software, or combinations thereof. For example, the Scell activation module 708 may be implemented as a processor, circuit, and/or instructions 706 stored in the memory 704 and executed by the processor 702. In some examples, the Scell activation module 708 can be integrated within the modem subsystem 712. For example, the Scell activation module 708 can be implemented by a combination of software components (e.g., executed by a DSP or a general processor) and hardware components (e.g., logic gates and circuitry) within the modem subsystem 712.

The Scell activation module 708 may be used for various aspects of the present disclosure, for example, aspects of FIGS. 3, 4A, 4B, 5A, 5B, 8, and/or 9. In one aspect, the Scell activation module 708 is configured to receive, from a BS via a first cell, an activation command to activate a second cell different from the first cell. The BS may be the BS 105, the BS 502, and or the BS 600. In another aspect, the Scell activation module 708 is configured to receive, from the BS via the second cell during a cell activation period, a first reference signal different from a synchronization signal block (SSB) based on beam information. In another aspect, the Scell activation module 708 is configured to perform a first measurement of the first reference signal. In another aspect, the Scell activation module 708 is configured to operate in the second cell based on the first measurement.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704 and/or the Scell activation module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., UE capability report, MSG1, MSG3, ACK/NACK, PUCCH) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may include one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., PDCCH, PDSCH, RRC configuration, SSB, SIB, PDCCH, search space configurations) to the Scell activation module 708 for processing. The antennas 716 may include multiple antennas of similar or different designs in order to sustain multiple transmission links. The RF unit 714 may configure the antennas 716.

In some aspects, the processor 702 is configured to coordinate with the Scell activation module 708 to cause the transceiver 710 to: receive, from a BS via a first cell, an activation command to activate a second cell different from the first cell; receive, from the BS via the second cell during a cell activation period, a first reference signal different from a synchronization signal block (SSB) based on beam information. In another aspect, the processor 702 is configured to perform a first measurement of the first reference signal, and operate in the second cell based on the first measurement.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
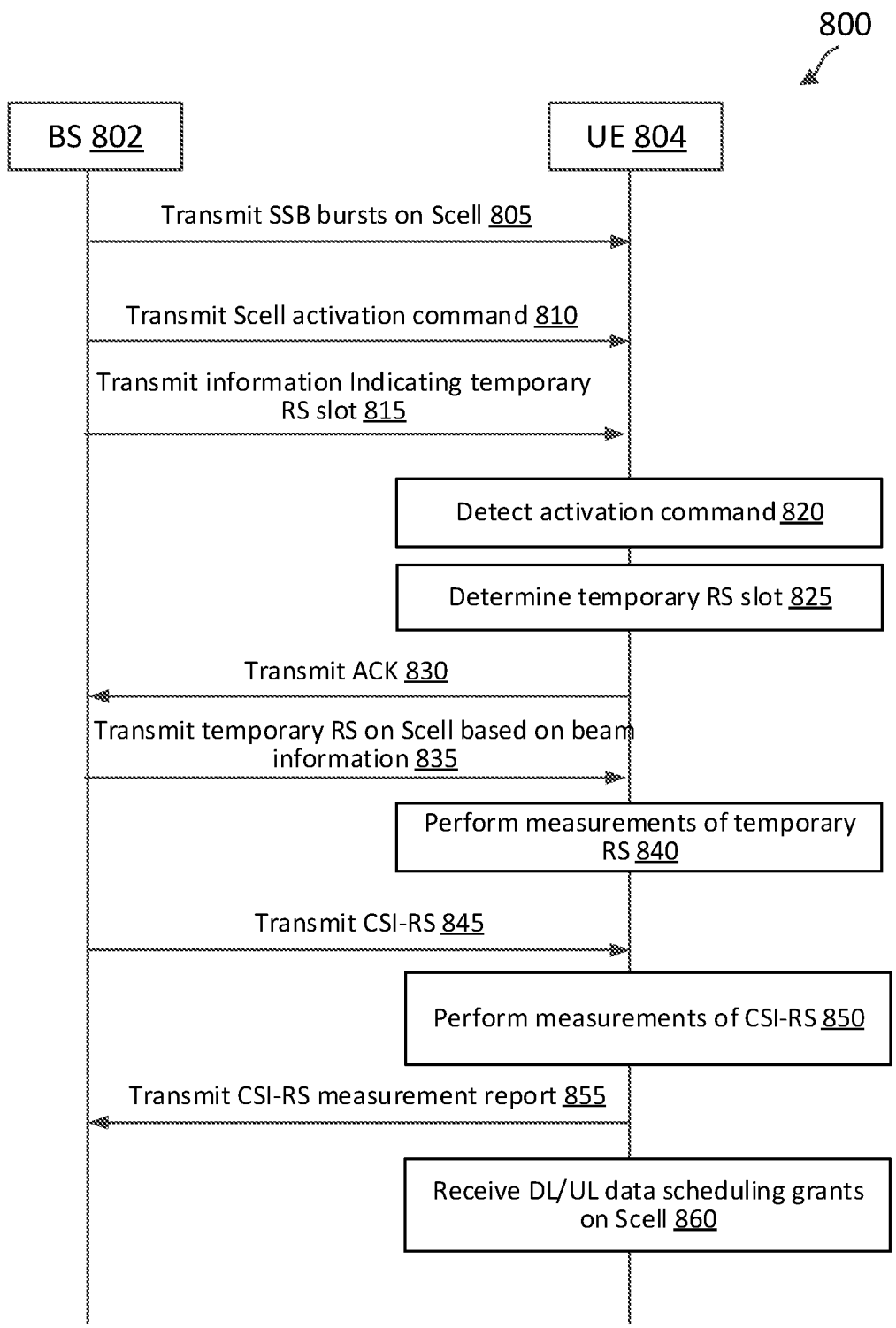
FIG. 8 is a signaling diagram illustrating an Scell activation method according to some aspects of the present disclosure.

FIG. 8 is a signaling diagram illustrating a cross-carrier scheduling method 800 according to some aspects of the present disclosure. The method 800 may be implemented between a BS 802, and a UE 804. The BS 802 may correspond to a BS 105, a BS 502, or a BS 600, and the UE 804 may correspond to a UE 115, a UE 504, or a UE 700. In some instances, the UE 804 may be configured for carrier aggregation (CA) and cell activation. The method 800 may be implemented in conjunction with the schemes 300, 400, 500a-500d, and/or 600, discussed with reference to FIGS. 3, 4A, 4B, 5A, and 5B. As illustrated, the method 800 includes a number of enumerated actions, but embodiments of the method 800 may include additional actions before, after, and in between the enumerated actions. In some embodiments, one or more of the enumerated actions may be omitted or performed in a different order.

At a high level, a BS 802 in communication with a UE 804 over a Pcell can activate an Scell for CA operations. To activate an Scell in a CA communication scheme, a BS transmits one or more temporary RSs on the Scell to be activated, and indicates, to the UE, the slot(s) in which the one or more temporary RSs is being transmitted. The BS transmits the one or more temporary RSs based on beam information associated with the Scell. In some instances, the BS may also transmit RSs on a Pcell, for example, when the Pcell and the Scell operate over the same frequency band. In some aspects, the beam information may be determined by the BS, or by the UE. The temporary RS may be a TRS, for example, and may be transmitted independent of an SSB or SSB burst schedule periodicity (e.g., between two SSB or SSB bursts), such that the temporary RS can be transmitted before a given SSB. The UE performs one or more measurements and/or detection protocols, such as time/frequency tracking, based on the temporary RS. Based on the measurements, the UE may activate the Scell such that the Scell can be used to schedule DL and/or UL data transmissions.

At action 805, the BS 802 transmits a series of SSBs, or bursts of SSBs, to the UE over the Scell. The BS may transmit the SSBs with an SSB periodicity. For example, the BS may transmit one SSB or SSB burst every 20 ms, 40 ms, 60 ms, 80 ms, 160 ms, or any other suitable time period, both greater or smaller. The slots and periodicity of the SSBs may be fixed, in some aspects. In some aspects, each SSB in an SSB burst (e.g., a set of M SSBs) may be associated with a different beam. In that regard, in some aspects, each SSB in an SSB burst may be associated with a different SSB index. The SSB bursts may be transmitted according to a beam sweeping protocol in a plurality of Tx beam directions. In some instances, the BS 802 may utilize one or more components, such as the processor 602, the memory 604, the Scell activation module 608, the transceiver 610, the modem 612, and the one or more antennas 616, to perform aspects of action 805.

At action 810, the BS transmits an Scell activation command to the UE, for example, over a Pcell. The Scell activation command may be transmitted as a DL data transmission carried by a PDSCH, in some aspects. For example, the Scell activation may be indicated in a MAC-CE carried by a PDSCH. In some instances, the BS 802 may utilize one or more components, such as the processor 602, the memory 604, the Scell activation module 608, the transceiver 610, the modem 612, and the one or more antennas 616, to perform aspects of action 810.

At action 815, the BS transmits information to the UE associated with the triggering of one or more temporary RSs, or bursts of temporary RSs, associated with the Scell activation. For example, the information may indicate the slot(s) where the temporary RS or bursts of temporary RSs is/are transmitted, the NZP-CSI-RS resource set index associated with the temporary RS, and/or any other suitable information that can be used by the UE to identify and measure the temporary RS. In some aspects, the information may be transmitted in a MAC-CE carried by a PDSCH. For example, the information may be transmitted in the same MAC-CE that carries the Scell activation command transmitted in action 810. In other aspects, the information may be transmitted in a different MAC-CE than the MAC-CE carrying the Scell activation command. In another aspect, the information may be carried in control information, such as DCI. The DCI may be a different DCI than the DCI that schedules the MAC-CE carrying the Scell activation command. In other aspects, the DCI may be carried by a different PDCCH other than the PDCCH that schedules the PDSCH carrying the Scell activation command.

In some aspects, the BS 802 may also indicate, to the UE 804, beam information associated with the temporary RS. For example, in some aspects, the beam information may include QCL information and/or a TCI state associated with the temporary RS. The QCL information and/or the TCI state may correspond to a certain transmit beam in which the BS 802 may use for transmitting the temporary RS. In some aspects, the BS 802 may determine the beam information based on SSBs that are being monitored by the UE 504. For instance, the BS 802 may receive, from the UE 804, measurements of the SSB bursts transmitted at action 805. In some aspects, the BS 802 may indicate the beam information (e.g., TCI state) to the UE 804 before transmitted the activation command at action 810. In some aspects, the BS 802 may indicate the beam information to the UE 804 in a MAC-CE transmitted on an active serving cell operating in a same band as the Scell. In some aspects, the BS 802 may indicate the beam information to the UE 804 in a DCI transmitted on the active serving cell operating in the same band as the Scell (e.g., the Pcell). In some instances, the BS 802 may utilize one or more components, such as the processor 602, the memory 604, the Scell activation module 608, the transceiver 610, the modem 612, and the one or more antennas 616, to perform aspects of action 815. In some aspects, the BS may not trigger the UE with an explicit trigger for the temporary RS, and thus action 915 can be optional. In other words, the transmission of the temporary RS can be an implicit indication based on the BS transmitting the activation command to the UE. In some aspects, the temporary RS can be UE-specific.

At action 820, the UE 804 detects the activation command transmitted in action 910. Detecting the activation command may include decoding the control information (e.g., DCI) scheduling the DL data carrying the Scell activation command in the PDSCH, and then identifying and decoding the DL data carrying the Scell activation command. The Scell activation command may indicate one or more parameters associated with the Scell, such as a frequency range of the Scell, and one or more system configuration parameters associated with the Scell. In some instances, the UE 804 may utilize one or more components, such as the processor 702, the memory 704, the Scell activation module 708, the transceiver 710, the modem 712, and the one or more antennas 716, to perform aspects of action 820.

At action 825, the UE 804 determines, based on the information transmitted in action 815, the slot and/or set of resources (e.g., NZP-CSI-RS resource set index) in which the temporary RS will be transmitted on the Scell. In some instances, the UE 804 may utilize one or more components, such as the processor 702, the memory 704, the Scell activation module 708, the transceiver 710, the modem 712, and the one or more antennas 716, to perform aspects of action 825.

At action 830, the UE 804 transmits, to the BS 802, an ACK in response to the Scell activation command. The ACK may be transmitted according to a HARQ procedure. The delay between receiving the Scell activation command and transmitting the ACK may be referred to as $T_{HARQ}$. In some instances, the UE 804 may utilize one or more components, such as the processor 702, the memory 704, the Scell activation module 708, the transceiver 710, the modem 712, and the one or more antennas 716, to perform aspects of action 830.

At action 835, the BS 802 transmits, on the Scell, one or more temporary RSs or bursts of temporary RSs indicated in the information transmitted in action 815. One or more of the temporary RSs may include, for example, an NZP-CSI-RS, such as a TRS. A TRS may be a NZP-CSI-RS configured for tracking purpose, for example, configured by an NZP-CSI-RS resource set configured in a higher layer with trs_info. In other aspects, one or more of the temporary RS may include a—TRS NZP-CSI-RS that is not specifically configured for tracking purpose, for example, configured by an NZP-CSI-RS resource without a trs_info configuration. In some aspects, one or more of the temporary RSs may include 2 NZP-CSI-RS resources in one slot, or 4 NZP-CSI-RS resources in two consecutive slots. In some aspects, the BS 802 may transmit the temporary RSs over the bandwidth of the DL BWP that will be active when the Scell is first activated (e.g., the DL BWP with first-active-DL-BWP-id).

In some aspects, the BS 802 may transmit a plurality of bursts of temporary RS at action 835. For example, as described with respect to FIGS. 5A and 5B, the BS 802 may transmit the bursts in subsets corresponding to different SSB indices. In this regard, the different subsets may correspond to different Tx beams. The temporary RS burst in each subset may be transmitted consecutively as shown in FIG. 5A (e.g., with the BS 802 using a fixed transmit beam while the UE 804 sweeps through a set of receive beams). Alternatively, the temporary RS burst in each subset may be transmitted non-consecutively as shown in FIG. 5B (e.g., with the BS 802 sweeping through the set of transmit beam while the UE 804 utilizes a fixed receive beam for receptions and measurements).

In some aspects, the BS 802 may also transmit one or more of the temporary RSs on the Pcell, for example, when the Pcell and the Scell operate over the same frequency band. For instance, in some wireless communication protocols, SSBs are to be transmitted in all frequency carriers in the same band and in the same slot. Accordingly, the temporary RSs may be transmitted on the Scell and the Pcell in a same slot. In some aspects, all of the temporary RSs transmitted by the BS 802 for the Scell activation are transmitted on both the Scell and the Pcell. In other aspects, only one or some of the temporary RSs transmitted by the BS 802 for the Scell activation are transmitted on both the Scell and the Pcell.

In some aspects, the time period that runs from the time the ACK is transmitted in action 830 to 2 ms after the temporary RS is received at action 835 is referred to as $T_{ActivationTime}$. It will be understood that 2 ms in this instance is exemplary and that other delays may be included in $T_{ActivationTime}$, both greater and smaller. In some instances, the BS 802 may utilize one or more components, such as the processor 602, the memory 604, the Scell activation module 608, the transceiver 610, the modem 612, and the one or more antennas 616, to perform aspects of action 835.

At action 840, the UE 804 performs one or more measurements and/or detection protocols based on the temporary RS. For example, the UE 804 may perform frequency and/or time tracking (e.g., fine tracking), AGC, and/or cell detection based on the temporary RS. The measurement/detection protocols performed based on the temporary RS may depend on UE capabilities, whether the Scell is known to the UE, and whether there is another active serving cell in a same frequency band as the Scell. For example, if there is another active serving cell in the same frequency band as the Scell to be activated, or if the Scell was previously activated, the UE may perform frequency and/or time tracking only using the temporary RS. In some aspects, the UE 804 may perform reception and/or measurement of the temporary RS based on the beam information provided by the BS 802. In some aspects, the UE 804 may determine the beam information based on a QCL relationship and/or a TCI state associated with an SSB monitored by the UE 804 in another cell within the same band as the Scell. In another aspect, if there is not an active serving cell in the same frequency band as the Scell to be activated, and the Scell is not known to the UE, the BS 802 may transmit bursts of temporary RSs as discussed above in relation to FIGS. 5A and 5B to facilitate identification of a preferred Tx/Rx beam pair between the BS 802 and the UE 804 for communication in the Scell and AGC training at the UE 804, and may transmit another temporary RS based on the preferred transmit beam to facilitate time/frequency tracking at the UE 804. In some aspects, the UE 804 may use a combination of temporary RSs and SSBs transmitted by the BS on the Scell to perform the Scell activation measurement/detection protocols.

As explained above, in some aspects, the UE 804 also performs one or more measurement/detection protocols based on corresponding temporary RSs transmitted on the Pcell. For example, when the Scell and the Pcell are in the same band, one or more of AGC, time/frequency tracking, and/or cell detection may be performed by the UE 804 on the Pcell.

In some aspects, in addition to performing the measurements described above, the UE may determine a preferred Tx/Rx beam pair based on measurements of the bursts of temporary RSs, and transmit a report to the BS 802 indicating the preferred Tx beam. In some aspects, the method 800 may include receiving one or more further temporary RSs transmitted based on the preferred Tx/Rx beam pair. In some instances, the UE 804 may utilize one or more components, such as the processor 702, the memory 704, the Scell activation module 708, the transceiver 710, the modem 712, and the one or more antennas 716, to perform aspects of action 840.

At action 845, the BS 802 transmits a CSI-RS to the UE 804 over the Scell. The BS 802 may configure the UE 804 with a CSI-RS resource set and may transmit the CSI-RS using a resource in the CSI-RS resource set. In some instances, the BS 802 may transmit a CSI-RS resource set configuration to the UE 804 over the Pcell. In some instances, the BS 802 may utilize one or more components, such as the processor 602, the memory 604, the Scell activation module 608, the transceiver 610, the modem 612, and the one or more antennas 616, to perform aspects of action 845.

At action 850, the UE 804 performs a measurement of the CSI-RS. In some aspects, the measurements may include reference signal receive power (RSRP), reference signal received quality (RSRQ), channel quality indicator (CQI), preceding matrix indicator (PMI), rank information, and/or the like. In some instances, the UE 804 may utilize one or more components, such as the processor 702, the memory 704, the Scell activation module 708, the transceiver 710, the modem 712, and the one or more antennas 716, to perform aspects of action 850.

At action 855, the UE 804 transmits a CSI-RS measurement report to the BS 802 based on the CSI-RS measurement performed at action 850. The CSI-RS measurement report may include RSRP, RSRQ, CQI, PMI, and/or rank information. The BS 802 may determine transmission parameters for communication with the UE 804 based on the CSI-RS measurement report. The delay from the end of $T_{ActivationTime}$ to the time the CSI-RS report is transmitted may be referred to as $T_{CSIReporting}$. In some aspects, the total delay that includes THARQ, $T_{ActivationTime}$, and $T_{CSIReporting}$ is known as the Scell Activation Delay. In some instances, the UE 804 may utilize one or more components, such as the processor 702, the memory 704, the Scell activation module 708, the transceiver 710, the modem 712, and the one or more antennas 716, to perform aspects of action 855.

At action 860, the UE 804 can receive DL and/or UL data scheduling grants on the activated Scell. In some instances, the UE 804 may utilize one or more components, such as the processor 702, the memory 704, the Scell activation module 708, the transceiver 710, the modem 712, and the one or more antennas 716, to perform aspects of action 855.

Figure 9:
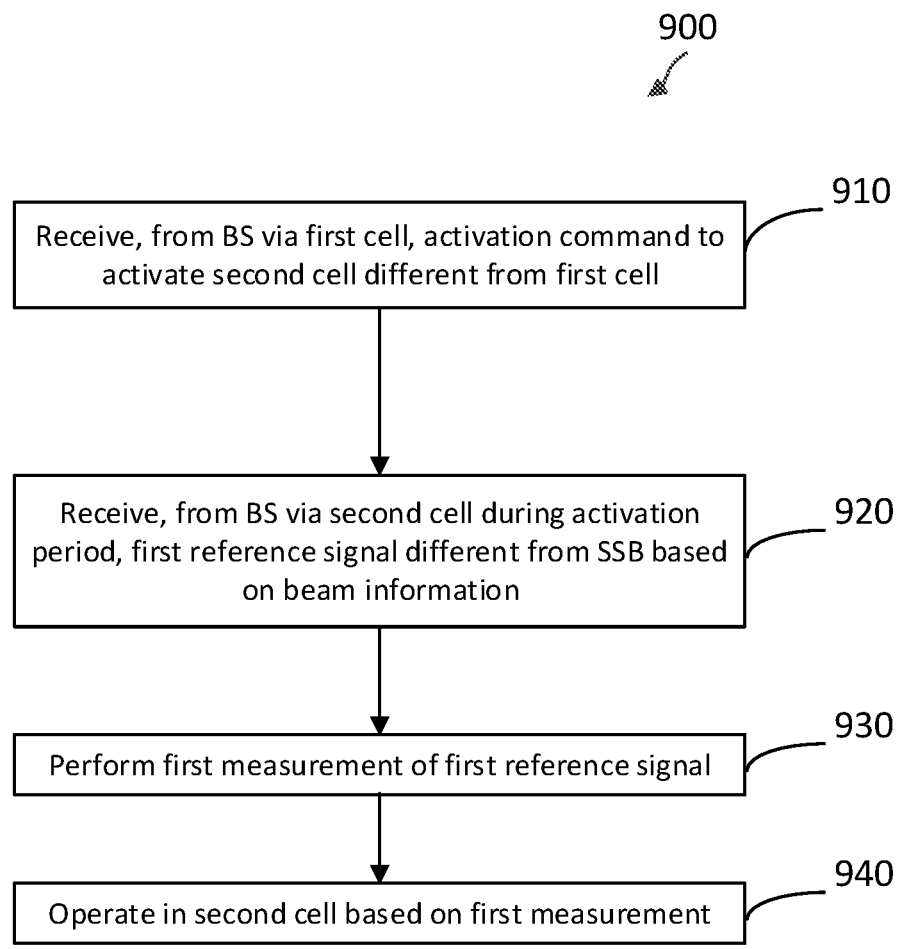
FIG. 9 is a flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 700, may utilize one or more components, such as the processor 702, the memory 704, the Scell activation module 708, the transceiver 710, the modem 712, and the one or more antennas 716, to execute the steps of method 900. The method 900 may employ similar mechanisms as described above in FIGS. 3, 4A, 4B, 5A, and/or 5B. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the UE receives, from a BS via a first cell, an activation command to activate a second cell different from the first cell.

At block 920, the UE receives, from the BS via the second cell during a cell activation period, a first reference signal different from an SSB based on beam information. In one aspect, receiving the first reference signal includes receiving a plurality of reference signal bursts, wherein at least one of the plurality of reference signal bursts includes the first reference signal. In one aspect, a first subset of the plurality of reference signal bursts is associated with a first transmission configuration indicator (TCI) state corresponding to first SSB of a set of SSBs. In some aspects, a second subset of the plurality of reference signal bursts is associated with a second TCI state corresponding to a second SSB of the set of SSBs, wherein the second SSB is different from the first SSB. In some aspects, the beam information includes a set of receive beam characteristics, and the receiving the first reference signal includes receiving a first reference signal burst in the first subset using a first receive beam characteristic from the set of receive beam characteristics; and receiving a second reference signal burst in the first subset using a second receive beam characteristic from the set of receive beam characteristics.

In some aspects, the method 900 further includes transmitting, to the BS, a report including measurements of the plurality of reference signal bursts. In some aspects, the method 900 further includes selecting a third receive beam characteristic from the set of receive beam characteristics based on the measurements of the plurality of reference signal bursts, the third receive beam characteristic associated with a reference signal burst in the first subset; and receiving, based on the first receive beam characteristic, a second reference signal after receiving the plurality of reference signal bursts, the second reference signal associated with the first TCI state corresponding to the first SSB based on the measurements of the plurality of reference signal bursts. In some aspects, the first subset includes consecutive reference signal bursts. In some aspects, the first subset includes non-consecutive reference signal bursts.

In one aspect, the first reference signal includes a non-zero power (NZP) channel state information reference signal (CSI-RS). In another aspect, the first reference signal includes a tracking reference signal (TRS).

At block 930, the UE performs a first measurement of the first reference signal. In some aspects, performing the first measurement of the first reference signal includes the UE performing the first measurement of the first reference signal comprises performing an automatic gain control (AGC) based on one or more of the plurality of reference signal bursts, and wherein the method further comprises performing at least one of time tracking or frequency tracking based on the second reference signal.

At block 940, the UE operates in the second cell based on the first measurement.

In some aspects, the method 900 further includes the UE receiving, from the BS, the beam information, wherein the beam information indicates at least one of quasi-co-located (QCL) information or a transmission configuration indicator (TCI) state for the first reference signal. In one aspect, the UE receiving the beam information comprises the UE receiving a media access control-control element (MAC-CE) indicating the at least one of the QCL information or the TCI state for the first reference signal. In another aspect, the UE receiving the beam information comprises the UE receiving a downlink control information (DCI) indicating the at least one of the QCL information or the TCI state for the first reference signal. In some aspects, the UE receiving the activation command comprises receiving downlink data comprising the activation command, and wherein the downlink data indicates the at least one of the QCL information or the TCI state for the first reference signal. In some aspects, the UE receiving the activation command includes the UE receiving downlink data comprising the activation command. In some aspects, the downlink data indicates the at least one of the QCL information or the TCI state for the first reference signal.

In some aspects, the method 900 further includes the UE receiving, from the BS via a third cell, an SSB; determining the second cell operates within a same frequency band as the third cell; and determining the beam information based on at least one of quasi-co-located (QCL) information or a transmission configuration indicator (TCI) state associated with the SSB in response to determining the second cell operates within the same frequency band as the third cell. In some aspects, the method 900 further includes the UE receiving, from the BS via the second cell, one or more SSBs before receiving the activation command; and transmitting, to the BS, a measurement report based on the one or more SSBs. In some aspects, the beam information includes a transmission configuration indicator (TCI) state associated with a preferred SSB of the one or more SSBs, the preferred SSB being based on the measurement report.

In some aspects, the method 900 further includes the UE receiving, from the BS via the second cell, a set of SSBs, and performing a cell detection of the second cell based on the set of SSBs. In another aspect, the plurality of reference signal bursts includes a plurality of tracking reference signals (TRSs).

Figure 10:
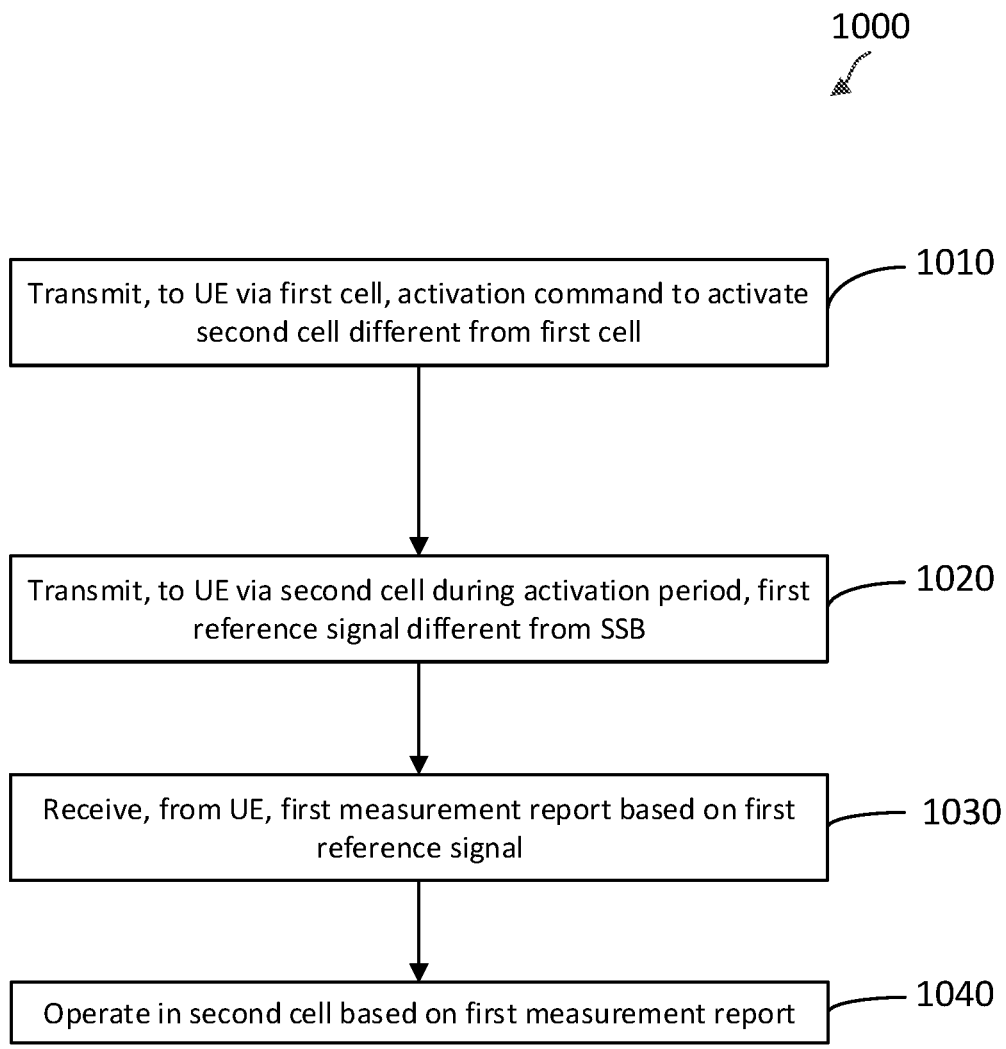
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the BSs 105, 600, may utilize one or more components, such as the processor 602, the memory 604, the Scell activation module 608, the transceiver 610, the modem 612, and the one or more antennas 616, to execute the steps of method 1000. The method 1000 may employ similar mechanisms as described above in FIGS. 3-10 and 13. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the BS transmits, to a UE via a first cell, an activation command to activate a second cell different from the first cell.

At block 1020, the BS transmits, to the UE via the second cell during a cell activation period, a first reference signal different from an SSB, based on beam information. In some aspects, the transmitting the first reference signal includes the BS transmitting a plurality of reference signal bursts, wherein at least one of the plurality of reference signal bursts includes the first reference signal. In some aspects, a first subset of the plurality of reference signal bursts is associated with a first transmission configuration indicator (TCI) state corresponding to a first SSB of a set of SSBs. In some aspects, a second subset of the plurality of reference signal bursts is associated with a second TCI state corresponding to a second SSB of the set of SSBs, wherein the second SSB is different from the first SSB. In some aspects, the beam information includes a set of transmit beam characteristics, and transmitting the first reference signal includes: transmitting a first reference signal burst in the first subset using a first transmit beam characteristic of the set of transmit beam characteristics, the first transmit beam characteristic corresponding to the first TCI state; and transmitting a second reference signal burst in the first subset using a second transmit beam characteristic of the set of transmit beam characteristics, the second transmit beam characteristic corresponding to the second TCI state. In some aspects, the first reference signal includes a non-zero power (NZP) channel state information reference signal (CSI-RS). In some aspects, the first reference signal includes a tracking reference signal (TRS).

At block 1030, the BS receives, from the UE, a first measurement report based on the first reference signal.

At block 1040, the BS operates in the second cell based on the first measurement report.

In some aspects, the method 1000 further includes the BS transmitting, to the UE, the beam information, wherein the beam information indicates at least one of quasi-co-located (QCL) information or a transmission configuration indicator (TCI) state for the first reference signal. In some aspects, transmitting the beam information includes transmitting a media access control control element (MAC-CE) indicating the at least one of the QCL information or the TCI state for the first reference signal. In some aspects, transmitting the beam information includes the BS transmitting a downlink control information (DCI) indicating the at least one of the QCL information or the TCI state for the first reference signal. In some aspects, the BS transmitting the activation command at block 1010 includes the BS transmitting downlink data comprising the activation command, and wherein the downlink data indicates the at least one of the QCL information or the TCI state for the first reference signal.

In some aspects, the method 1000 further includes the BS: transmitting, to the UE via a third cell operating in a same frequency band as the second cell, an SSB; receiving, from the UE, a second measurement report associated with the SSB; and determining, based on the second measurement report, the beam information including a TCI state corresponding to the SSB. In some aspects, transmitting the first reference signal includes the BS transmitting, using a transmit beam characteristic corresponding to the TCI state, the first reference signal.

In some aspects, the method 1000 further includes the BS: transmitting, to the UE via the second cell, one or more SSBs before transmitting the activation command; and receiving, from the UE, a second measurement report associated with the one or more SSBs; and determining, based on the second measurement report, the beam information including a transmission configuration indicator (TCI) state corresponding to a preferred SSB of the one or more SSBs. In some aspects, the transmitting the first reference signal includes the BS transmitting, using a transmit beam characteristic corresponding to the TCI state, the first reference signal.

In some aspects, the method 1000 further includes receiving, from the UE, a second measurement report of the plurality of reference signal bursts; transmitting, to the UE using the first transmit beam characteristic based on the second measurement report, a second reference signal after transmitting the plurality of reference signal bursts. In some aspects, the first subset includes consecutive reference signal bursts. In some aspects, the first subset includes non-consecutive reference signal bursts. In some aspects, the plurality of reference signal bursts includes a plurality of tracking reference signals (TRSs).

Example Aspects of the Present Disclosure

Aspect 1. A method of wireless communication performed by a user equipment (UE), the method comprising: receiving, from a base station (BS) via a first cell, an activation command to activate a second cell different from the first cell; receiving, from the BS via the second cell during a cell activation period, a first reference signal different from a synchronization signal block (SSB) based on beam information; performing a first measurement of the first reference signal; and operating in the second cell based on the first measurement.

Aspect 2. The method of aspect 1, further comprising: receiving, from the BS, the beam information, wherein the beam information indicates at least one of quasi-co-located (QCL) information or a transmission configuration indicator (TCI) state for the first reference signal.

Aspect 3. The method of aspect 2, wherein the receiving the beam information comprises receiving a media access control control element (MAC-CE) indicating the at least one of the QCL information or the TCI state for the first reference signal.

Aspect 4. The method of aspect 2, wherein the receiving the beam information comprises receiving a downlink control information (DCI) indicating the at least one of the QCL information or the TCI state for the first reference signal.

Aspect 5. The method of aspect 2, wherein the receiving the activation command comprises receiving downlink data comprising the activation command, and wherein the downlink data indicates the at least one of the QCL information or the TCI state for the first reference signal.

Aspect 6. The method of any of aspects 1-5, further comprising: receiving, from the BS via a third cell, an SSB; determining the second cell operates within a same frequency band as the third cell; and determining the beam information based on at least one of quasi-co-located (QCL) information or a transmission configuration indicator (TCI) state associated with the SSB in response to determining the second cell operates within the same frequency band as the third cell.

Aspect 7. The method of any of aspects 1-5, further comprising: receiving, from the BS via the second cell, one or more SSBs before receiving the activation command; and transmitting, to the BS, a measurement report based on the one or more SSBs, wherein the beam information includes a transmission configuration indicator (TCI) state associated with a preferred SSB of the one or more SSBs, the preferred SSB being based on the measurement report.

Aspect 8. The method of any of aspects 1-7, wherein the receiving the first reference signal comprises: receiving a plurality of reference signal bursts, wherein at least one of the plurality of reference signal bursts includes the first reference signal, wherein a first subset of the plurality of reference signal bursts is associated with a first transmission configuration indicator (TCI) state corresponding to a first SSB of a set of SSBs, and wherein a second subset of the plurality of reference signal bursts is associated with a second TCI state corresponding to a second SSB of the set of SSBs, wherein the second SSB is different from the first SSB.

Aspect 9. The method of aspect 8, wherein the beam information comprises a set of receive beam characteristics, and wherein the receiving the first reference signal further comprises: receiving a first reference signal burst in the first subset using a first receive beam characteristic of the set of receive beam characteristics; and receiving a second reference signal burst in the first subset using a second receive beam characteristic from the set of receive beam characteristics.

Aspect 10. The method of aspect 9, further comprising: transmitting, to the BS, a report including measurements of the plurality of reference signal bursts; selecting a third receive beam characteristic from the set of receive beam characteristics based on the measurements of the plurality of reference signal bursts, the third receive beam characteristic associated with a reference signal burst in the first subset; and receiving, based on the first receive beam characteristic, a second reference signal after receiving the plurality of reference signal bursts, the second reference signal associated with the first TCI state corresponding to the first SSB based on the measurements of the plurality of reference signal bursts.

Aspect 11. The method of aspect 10, wherein the performing the first measurement of the first reference signal comprises performing an automatic gain control (AGC) based on one or more of the plurality of reference signal bursts, and wherein the method further comprises performing at least one of time tracking or frequency tracking based on the second reference signal.

Aspect 12. The method of any of aspects 9-11, wherein the first subset comprises consecutive reference signal bursts.

Aspect 13. The method of any of aspects 9-11, wherein the first subset comprises non-consecutive reference signal bursts.

Aspect 14. The method of any of aspects 9-13, further comprising: receiving, from the BS via the second cell, a set of SSBs; and performing a cell detection of the second cell based on the set of SSBs.

Aspect 15. The method of any of aspects 9-14, wherein the plurality of reference signal bursts comprises a plurality of tracking reference signals (TRSs).

Aspect 16. The method of any of aspects 1-15, wherein the first reference signal comprises a non-zero power (NZP) channel state information reference signal (CSI-RS).

Aspect 17. The method of any of aspects 1-15, wherein the first reference signal comprises a tracking reference signal (TRS).

Aspect 18. A method of wireless communication performed by a base station (BS), the method comprising: transmitting, to a user equipment (UE) via a first cell, an activation command to activate a second cell different from the first cell; transmitting, to the UE via the second cell during a cell activation period, a first reference signal different from a synchronization signal block (SSB) based on beam information; receiving, from the UE, a first measurement report based on the first reference signal; and operating in the second cell based on the first measurement report.

Aspect 19. The method of aspect 18, further comprising: transmitting, to the UE, the beam information, wherein the beam information indicates at least one of quasi-co-located (QCL) information or a transmission configuration indicator (TCI) state for the first reference signal.

Aspect 20. The method of aspect 19, wherein the transmitting the beam information comprises transmitting a media access control control element (MAC-CE) indicating the at least one of the QCL information or the TCI state for the first reference signal.

Aspect 21. The method of aspect 19, wherein the transmitting the beam information comprises transmitting a downlink control information (DCI) indicating the at least one of the QCL information or the TCI state for the first reference signal.

Aspect 22. The method of aspect 19, wherein the transmitting the activation command comprises transmitting downlink data comprising the activation command, and wherein the downlink data indicates the at least one of the QCL information or the TCI state for the first reference signal.

Aspect 23. The method of any of aspects 18-22, further comprising: transmitting, to the UE via a third cell operating in a same frequency band as the second cell, an SSB; receiving, from the UE, a second measurement report associated with the SSB; and determining, based on the second measurement report, the beam information including a TCI state corresponding to the SSB, wherein the transmitting the first reference signal comprises transmitting, using a transmit beam characteristic corresponding to the TCI state, the first reference signal.

Aspect 24. The method of any of aspects 18-22, further comprising: transmitting, to the UE via the second cell, one or more SSBs before transmitting the activation command; receiving, from the UE, a second measurement report associated with the one or more SSBs; and determining, based on the second measurement report, the beam information including a transmission configuration indicator (TCI) state corresponding to a preferred SSB of the one or more SSBs, wherein the transmitting the first reference signal comprises transmitting, using a transmit beam characteristic corresponding to the TCI state, the first reference signal.

Aspect 25. The method of any of aspects 18-24, wherein the transmitting the first reference signal comprises: transmitting a plurality of reference signal bursts, wherein at least one of the plurality of reference signal bursts includes the first reference signal, wherein a first subset of the plurality of reference signal bursts is associated with a first transmission configuration indicator (TCI) state corresponding to a first SSB of a set of SSBs, and wherein a second subset of the plurality of reference signal bursts is associated with a second TCI state corresponding to a second SSB of the set of SSBs, wherein the second SSB is different from the first SSB.

Aspect 26. The method of aspect 25, wherein the beam information comprises a set of transmit beam characteristics, and wherein the transmitting the first reference signal further comprises: transmitting a first reference signal burst in the first subset using a first transmit beam characteristic of the set of transmit beam characteristics, the first transmit beam characteristic corresponding to the first TCI state; and transmitting a second reference signal burst in the first subset using a second transmit beam characteristic of the set of transmit beam characteristics, the second transmit beam characteristic corresponding to the second TCI state.

Aspect 27. The method of aspect 26, further comprising: receiving, from the UE, a second measurement report of the plurality of reference signal bursts; and transmitting, to the UE using the first transmit beam characteristic based on the second measurement report, a second reference signal after transmitting the plurality of reference signal bursts.

Aspect 28. The method of any of aspects 26-27, wherein the first subset comprises consecutive reference signal bursts.

Aspect 29. The method of any of aspects 26-27, wherein the first subset comprises non-consecutive reference signal bursts.

Aspect 30. The method of any of aspects 26-29, wherein the plurality of reference signal bursts comprises a plurality of tracking reference signals (TRSs).

Aspect 31. The method of any of aspects 18-30, wherein the first reference signal comprises a non-zero power (NZP) channel state information reference signal (CSI-RS).

Aspect 32. The method of any of aspects 18-30, wherein the first reference signal comprises a tracking reference signal (TRS).

Aspect 33. A user equipment (UE) comprising a processor and a transceiver configured to perform the actions of any of aspects 1-17.

Aspect 34. A base station (BS) comprising a processor and a transceiver configured to perform the actions of any of aspects 18-32.

Aspect 35. A non-transitory, computer-readable medium having program code recorded thereon, the program code comprising instructions executable by a user equipment (UE) to cause the UE to perform the actions of any of aspects 1-17.

Aspect 36. A non-transitory, computer-readable medium having program code recorded thereon, the program code comprising instructions executable by a base station (BS) to cause the BS to perform the actions of any of aspects 18-32.

Aspect 37. A user equipment (UE) comprising means for performing the actions of any of aspects 1-17.

Aspect 38. A base station (BS) comprising means for performing the actions of any of aspects 18-32.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A user equipment (UE), comprising:
one or more transceivers;
one or more memories; and
one or more processors coupled to the one or more transceivers and the one or more memories, the one or more memories storing instructions that are executable by the one or more processors, individually or in any combination, to cause the UE to:
receive, from a base station (BS) via a first cell, an activation command to activate a second cell different from the first cell;
receive, from the BS, a gap configuration indicating a gap between each burst of a plurality of reference signal bursts;
receive, from the BS via the second cell during a cell activation period, a first reference signal of the plurality of reference signal bursts different from a synchronization signal block (SSB) based on beam information and based on the gap configuration;
perform a first measurement of the first reference signal; and
operate in the second cell based on the first measurement.

2. The UE of claim 1, wherein the one or more processors are further configured, individually or in any combination, to cause the UE to:
receive, from the BS, the beam information, wherein the beam information indicates at least one of quasi-co-located (QCL) information or a transmission configuration indicator (TCI) state for the first reference signal.

3. The UE of claim 2, wherein the one or more processors are further configured, individually or in any combination, to cause the UE to receive a media access control control element (MAC-CE) indicating the at least one of the QCL information or the TCI state for the first reference signal.

4. The UE of claim 2, wherein the one or more processors are further configured, individually or in any combination, to cause the UE to receive a downlink control information (DCI) indicating the at least one of the QCL information or the TCI state for the first reference signal.

5. The UE of claim 2, wherein the one or more processors are further configured, individually or in any combination, to cause the UE to receive downlink data comprising the activation command, and wherein the downlink data indicates the at least one of the QCL information or TCI state for the first reference signal.

6. The UE of claim 1, wherein the one or more processors are further configured, individually or in any combination, to cause the UE to:
receive, from the BS via a third cell, an SSB;
determine the second cell operates within a same frequency band as the third cell; and
determine the beam information based on at least one of quasi-co-located (QCL) information or a transmission configuration indicator (TCI) state associated with the SSB in response to determining the second cell operates within the same frequency band as the third cell.

7. The UE of claim 1, wherein the one or more processors are further configured, individually or in any combination, to cause the UE to:
receive, from the BS via the second cell, one or more SSBs before receiving the activation command; and
transmit, to the BS, a measurement report based on the one or more SSBs,
wherein the beam information includes a transmission configuration indicator (TCI) state associated with a preferred SSB of the one or more SSBs, the preferred SSB being based on the measurement report.

8. The UE of claim 1, wherein the one or more processors are further configured, individually or in any combination, to cause the UE to:
receive the plurality of reference signal bursts,
wherein a first subset of the plurality of reference signal bursts is associated with a first transmission configuration indicator (TCI) state corresponding to a first SSB of a set of SSBs, and
wherein a second subset of the plurality of reference signal bursts is associated with a second TCI state corresponding to a second SSB of the set of SSBs, wherein the second SSB is different from the first SSB.

9. The UE of claim 8, wherein the beam information comprises a set of receive beam characteristics, and wherein the one or more processors are further configured, individually or in any combination, to cause the UE to:
receive a first reference signal burst in the first subset using a first receive beam characteristic from the set of receive beam characteristics; and
receive a second reference signal burst in the first subset using a second receive beam characteristic from the set of receive beam characteristics.

10. The UE of claim 9, wherein the one or more processors are further configured, individually or in any combination, to cause the UE to:
transmit, to the BS, a report including measurements of the plurality of reference signal bursts;
select a third receive beam characteristic from the set of receive beam characteristics based on the measurements of the plurality of reference signal bursts, the third receive beam characteristic associated with a reference signal burst in the first subset; and
receive, based on the first receive beam characteristic, a second reference signal after receiving the plurality of reference signal bursts, the second reference signal associated with the first TCI state corresponding to the first SSB based on the measurements of the plurality of reference signal bursts.

11. The UE of claim 10, wherein the one or more processors are further configured, individually or in any combination, to cause the UE to:
perform an automatic gain control (AGC) based on one or more of the plurality of reference signal bursts; and
perform at least one of time tracking or frequency tracking based on the second reference signal.

12. The UE of claim 9, wherein the first subset comprises consecutive reference signal bursts.

13. The UE of claim 9, wherein the first subset comprises non-consecutive reference signal bursts.

14. The UE of claim 9, wherein the one or more processors are further configured, individually or in any combination, to cause the UE to:
receive, from the BS via the second cell, a set of SSBs; and
perform a cell detection of the second cell based on the set of SSBs.

15. The UE of claim 1, wherein the plurality of reference signal bursts comprises a plurality of tracking reference signals (TRSs).

16. The UE of claim 1, wherein the first reference signal comprises a non-zero power (NZP) channel state information reference signal (CSI-RS).

17. The UE of claim 1, wherein the first reference signal comprises a tracking reference signal (TRS).

18. A method of wireless communication performed by a user equipment (UE), the method comprising:
- receiving, from a base station (BS) via a first cell, an activation command to activate a second cell different from the first cell;
- receiving, from the BS, a gap configuration indicating a gap between each burst of a plurality of reference signal bursts;
- receiving, from the BS via the second cell during a cell activation period, a first reference signal of the plurality of reference signal bursts different from a synchronization signal block (SSB) based on beam information and based on the gap configuration;
- performing a first measurement of the first reference signal; and
- operating in the second cell based on the first measurement.

19. The method of claim 18, further comprising:
- receiving, from the BS, the beam information, wherein the beam information indicates at least one of quasi-co-located (QCL) information or a transmission configuration indicator (TCI) state for the first reference signal.

20. The method of claim 19, wherein the receiving the beam information comprises receiving a media access control control element (MAC-CE) indicating the at least one of the QCL information or the TCI state for the first reference signal.

21. The method of claim 19, wherein the receiving the beam information comprises receiving a downlink control information (DCI) indicating the at least one of the QCL information or the TCI state for the first reference signal.

22. The method of claim 19, wherein the receiving the activation command comprises receiving downlink data comprising the activation command, and wherein the downlink data indicates the at least one of the QCL information or the TCI state for the first reference signal.

23. The method of claim 18, further comprising:
- receiving, from the BS via a third cell, an SSB;
- determining the second cell operates within a same frequency band as the third cell; and
- determining the beam information based on at least one of quasi-co-located (QCL) information or a transmission configuration indicator (TCI) state associated with the SSB in response to determining the second cell operates within the same frequency band as the third cell.

24. The method of claim 18, further comprising:
- receiving, from the BS via the second cell, one or more SSBs before receiving the activation command; and
- transmitting, to the BS, a measurement report based on the one or more SSBs,
- wherein the beam information includes a transmission configuration indicator (TCI) state associated with a preferred SSB of the one or more SSBs, the preferred SSB being based on the measurement report.

25. The method of claim 18, wherein the receiving the first reference signal comprises:
- receiving a plurality of reference signal bursts,
- wherein a first subset of the plurality of reference signal bursts is associated with a first transmission configuration indicator (TCI) state corresponding to a first SSB of a set of SSBs, and
- wherein a second subset of the plurality of reference signal bursts is associated with a second TCI state corresponding to a second SSB of the set of SSBs, wherein the second SSB is different from the first SSB.

26. The method of claim 25, wherein the beam information comprises a set of receive beam characteristics, and wherein the receiving the first reference signal further comprises:
- receiving a first reference signal burst in the first subset using a first receive beam characteristic of the set of receive beam characteristics; and
- receiving a second reference signal burst in the first subset using a second receive beam characteristic from the set of receive beam characteristics.

27. The method of claim 18, wherein the first reference signal comprises a non-zero power (NZP) channel state information reference signal (CSI-RS).

28. The method of claim 18, wherein the first reference signal comprises a tracking reference signal (TRS).

29. A non-transitory computer-readable medium having program code recorded therein, the program code comprising:
- code for causing a user equipment (UE) to receive, from a base station (BS) via a first cell, an activation command to activate a second cell different from the first cell;
- code for causing the UE to receive, from the BS, a gap configuration indicating a gap between each burst of a plurality of reference signal bursts;
- code for causing the UE to receive, from the BS via the second cell during a cell activation period, a first reference signal of the plurality of reference signal bursts different from a synchronization signal block (SSB) based on beam information and based on the gap configuration;
- code for causing the UE to perform a first measurement of the first reference signal; and
- code for causing the UE to operate in the second cell based on the first measurement.

30. A user equipment (UE), comprising:
- means for receiving, from a base station (BS) via a first cell, an activation command to activate a second cell different from the first cell;
- means for receiving, from the BS, a gap configuration indicating a gap between each burst of a plurality of reference signal bursts;
- means for receiving, from the BS via the second cell during a cell activation period, a first reference signal of the plurality of reference signal bursts different from a synchronization signal block (SSB) based on beam information and based on the gap configuration;
- means for performing a first measurement of the first reference signal; and
- means for operating in the second cell based on the first measurement.

* * * * *